United States Patent
Yoshida et al.

(10) Patent No.: US 9,092,147 B2
(45) Date of Patent: Jul. 28, 2015

(54) INFORMATION PROCESSING METHOD, INFORMATION PROCESSING SYSTEM, INFORMATION PROCESSING APPARATUS, AND PROGRAM

(75) Inventors: Kyosuke Yoshida, Kanagawa (JP); Yoshihiro Tamura, Kanagawa (JP); Ichiro Ogata, Kanagawa (JP); Yoshinori Takagi, Kanagawa (JP); Hirofumi Hibi, Kanagawa (JP); Daisuke Izaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 227 days.

(21) Appl. No.: 13/611,463

(22) Filed: Sep. 12, 2012

(65) Prior Publication Data

US 2013/0067177 A1 Mar. 14, 2013

(30) Foreign Application Priority Data

Sep. 14, 2011 (JP) ................................ 2011-200442

(51) Int. Cl.
*G06F 12/00* (2006.01)
*G06F 3/06* (2006.01)
*G06F 12/08* (2006.01)

(52) U.S. Cl.
CPC ............ *G06F 3/0613* (2013.01); *G06F 3/0656* (2013.01); *G06F 3/0685* (2013.01); *G06F 12/0862* (2013.01)

(58) Field of Classification Search
CPC ............ G06F 12/0862; G06F 12/0866; G06F 12/0875
See application file for complete search history.

(56) References Cited

U.S. PATENT DOCUMENTS

| | | | |
|---|---|---|---|
| 8,156,281 B1* | 4/2012 | Grosner et al. | 711/114 |
| 2006/0136674 A1* | 6/2006 | Kurosaki et al. | 711/137 |
| 2008/0005481 A1* | 1/2008 | Walker | 711/137 |
| 2008/0147980 A1* | 6/2008 | Peters et al. | 711/133 |
| 2010/0208385 A1* | 8/2010 | Toukairin | 360/75 |
| 2010/0325656 A1* | 12/2010 | Hardacker et al. | 725/31 |
| 2011/0219195 A1* | 9/2011 | Habusha et al. | 711/137 |

FOREIGN PATENT DOCUMENTS

JP 2008-41020 2/2008

* cited by examiner

*Primary Examiner* — Cheng-Yuan Tseng
*Assistant Examiner* — Arvind Talukdar
(74) *Attorney, Agent, or Firm* — Hazuki International, LLC

(57) ABSTRACT

An information processing method includes: grouping temporally consecutive data into a plurality of groups based on a reference defined in advance and storing the grouped data; reading, in response to an access request from an external apparatus, target data to be a target of the request from a first group including the target data and outputting the read target data to the external apparatus; and reading, in response to the reading of the target data, at least part of data from a second group different from the first group as read-ahead target data.

12 Claims, 18 Drawing Sheets

(A)

(B)

FIG.17
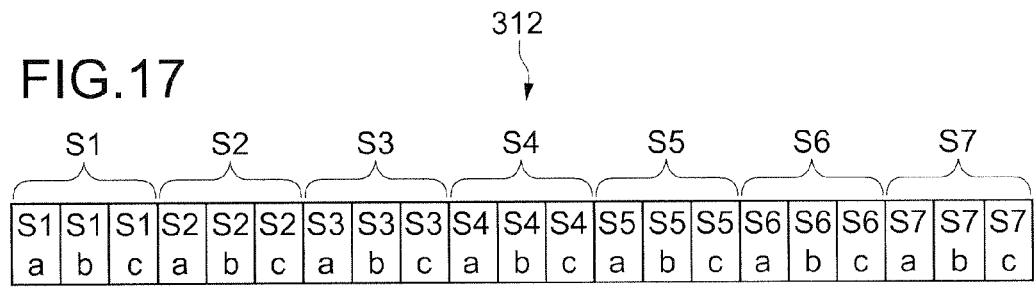
FIG.18
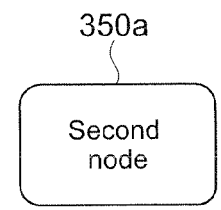
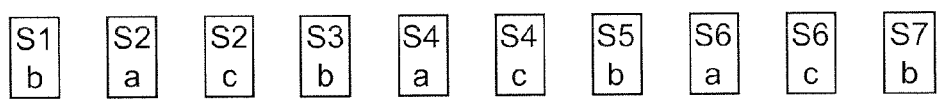
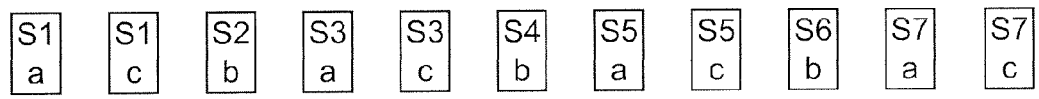
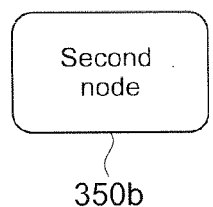

INFORMATION PROCESSING METHOD, INFORMATION PROCESSING SYSTEM, INFORMATION PROCESSING APPARATUS, AND PROGRAM

BACKGROUND

The present disclosure relates to an information processing method, an information processing system, an information processing apparatus, and a program that, for example, store video data or the like and output it to an external apparatus or the like.

From the past, there is known a storage system that, for example, stores content data such as imaged video data and outputs the data in response to a request from the external apparatus or the like. For example, the storage system outputs the video data or the like to an editing apparatus so that editing processing is performed.

For example, Japanese Patent Application Laid-open No. 2008-041020 (hereinafter, referred to as Patent Document 1) describes a disk device that stores a file, a client computer that instructs to perform a file operation such as file input/output, and a file server provided between the disk device and the client computer. According to the instruction from the client computer, the file server appropriately operates the file stored on the disk device (see paragraph [0015], FIGS. 1 and 2, and the like of Patent Document 1).

SUMMARY

In recent years, for example, content data to be a target of an editing operation or the like has increased in volume. For such data, it is desirable to realize a storage system that makes efficient access possible.

In view of the above-mentioned circumstances, there is a need for providing an information processing method, an information processing system, an information processing apparatus, and a program for realizing a storage system that makes efficient access possible.

According to an embodiment of the present disclosure, there is provided an information processing method including grouping temporally consecutive data into a plurality of groups based on a reference defined in advance and storing the grouped data.

In response to an access request from an external apparatus, target data to be a target of the request is read from a first group including the target data and the read target data is outputted to the external apparatus.

In response to the reading of the target data, at least part of data from a second group different from the first group is read as read-ahead target data.

In this information processing method, the temporally consecutive data is grouped into the plurality of groups based on the reference defined in advance and stored. Then, the target data to be the target of the access request is read from the first group and outputted. In response to the reading of the target data, the read-ahead target data is read from the second group different from the first group. Thus, by appropriately setting the reference and appropriately grouping the consecutive data, it is possible to realize a storage system that makes efficient access possible.

The temporally consecutive data may be a plurality of temporally consecutive frame images. In this case, the plurality of groups may each include at least one or more of the frame images. Further, the target data may be a target frame image to be the target of the request. Further, the read-ahead target data may be at least one or more of the frame images included in the second group.

In this information processing method, the temporally consecutive frame images are stored. The consecutive frame images are used as, for example, moving-image data, and hence often have large volume. For such data, the storage system that makes the efficient access possible is realized.

The storing the grouped data may include storing the plurality of frame images by a first storage unit configured to store the frame images and to have a first output capability for outputting the stored frame images and by a second storage unit configured to have a second output capability lower than the first output capability.

In this case, the reading target data may include outputting the target frame image stored on the first storage unit to the external apparatus.

The reading at least part of data may include reading the read-ahead target frame image as the read-ahead target data from the second storage unit and causing the first storage unit to store the read-ahead target frame image.

In this information processing method, the first storage unit configured to have the first output capability and the second storage unit configured to have the second output capability lower than the first output capability are used. Then, the target frame image stored on the first storage unit having the higher output capability is outputted to the external apparatus. Further, the read-ahead target frame image stored on the second storage unit having the lower output capability is stored on the first storage unit. With this, the efficient access becomes possible. Further, it is possible to reduce the costs necessary for realizing the storage system.

The reference defined in advance may be grouping for each scene. In this case, the storing the grouped data may include grouping the plurality of frame images into a plurality of scenes as the plurality of groups and storing the grouped frame images.

In this information processing method, the plurality of frame images are grouped into the plurality of scenes and stored. For example, the plurality of frame images are often accessed for each scene. Therefore, by performing grouping as described above, the efficient access becomes possible.

The information processing method may further include analyzing each of the plurality of scenes. In this case, the reading at least part of data may include reading the read-ahead target frame image based on the analysis result.

In this information processing method, each of the scenes is analyzed and the read-ahead target frame image is read based on the analysis result. With this, for example, the read-ahead processing and the like on the plurality of scenes having a high correlation with each other become possible. With this, the efficient access becomes possible.

The storing the grouped data may include storing the plurality of frame images by a plurality of first storage units and a plurality of second storage units.

By appropriately using the plurality of first storage units and the plurality of second storage units in this manner, the efficient access becomes possible. Further, it is possible to reduce the costs.

The information processing method may further include receiving, from the external apparatus, use mode information of the target frame image. In this case, the reading at least part of data may include reading the read-ahead target frame image based on the received use mode information.

In this information processing method, the read-ahead target frame image is read based on the use mode information received from the external apparatus. With this, the efficient access becomes possible.

The information processing method may further include changing the plurality of groups according to an instruction from a user, the instruction being transmitted through the external apparatus.

The plurality of groups may be changed according to the instruction of the user in this manner. With this, the efficient access becomes possible.

The storing the grouped data may include storing the consecutive data before grouping into the plurality of groups and grouping, at a predetermined timing before the access request from the external apparatus is received, the stored consecutive data into the plurality of groups and storing the grouped data.

For example, at a timing at which the processing load of a computer that executes this information processing method is lower, the grouping processing may be performed.

According to an embodiment of the present disclosure, there is provided an information processing system including a first storage apparatus, a second storage apparatus, and a control apparatus.

The first storage apparatus is configured to group temporally consecutive data into a plurality of groups based on a reference defined in advance and store at least part of the consecutive data and to have a first output capability for outputting the stored data.

The second storage apparatus is configured to store at least part of the data grouped into the plurality of groups and to have a second output capability for outputting the stored data, the second output capability being lower than the first output capability.

The control apparatus is configured to read, in response to an access request from an external apparatus, target data to be a target of the request from a first group including the target data and cause the first storage apparatus to output the read target data to the external apparatus and to cause, in response to the reading of the target data, the second storage apparatus to output at least part of data included in a second group different from the first group to the first storage apparatus as read-ahead target data.

According to an embodiment of the present disclosure, there is provided an information processing apparatus including a grouping unit, a first storage unit, a second storage unit, an output unit, and a reading unit.

The grouping unit is configured to group temporally consecutive data into a plurality of groups based on a reference defined in advance.

The first storage unit is configured to store at least part of the data grouped into the plurality of groups and to have a first output capability for outputting the stored data.

The second storage unit is configured to store at least part of the data grouped into the plurality of groups and to have a second output capability for outputting the stored data, the second output capability being lower than the first output capability.

The output unit is configured to read, in response to an access request from an external apparatus, target data to be a target of the request from a first group including the target data and to output the read target data to the external apparatus through the first storage unit.

The reading unit is configured to read, in response to the reading of the target data by the output unit, at least part of data included in a second group different from the first group from the second storage unit as read-ahead data and to cause the first storage unit to store the read data.

According to an embodiment of the present disclosure, there is provided a program that causes a computer as the grouping unit, the first storage unit, the second storage unit, the output unit, and the reading unit, which are described above.

As described above, according to the embodiments of the present disclosure, it is possible to realize a storage system that makes efficient access possible.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 17 is a schematic view showing moving-image data to be captured in the information processing system according to this embodiment;

FIG. 18 is a view for explaining how to arrange the moving-image data shown in FIG. 17 in a second node;

DETAILED DESCRIPTION OF EMBODIMENTS

Hereinafter, embodiments according to the present disclosure will be described with reference to the drawings.

First Embodiment

Configuration of Information Processing System

Figure 1:
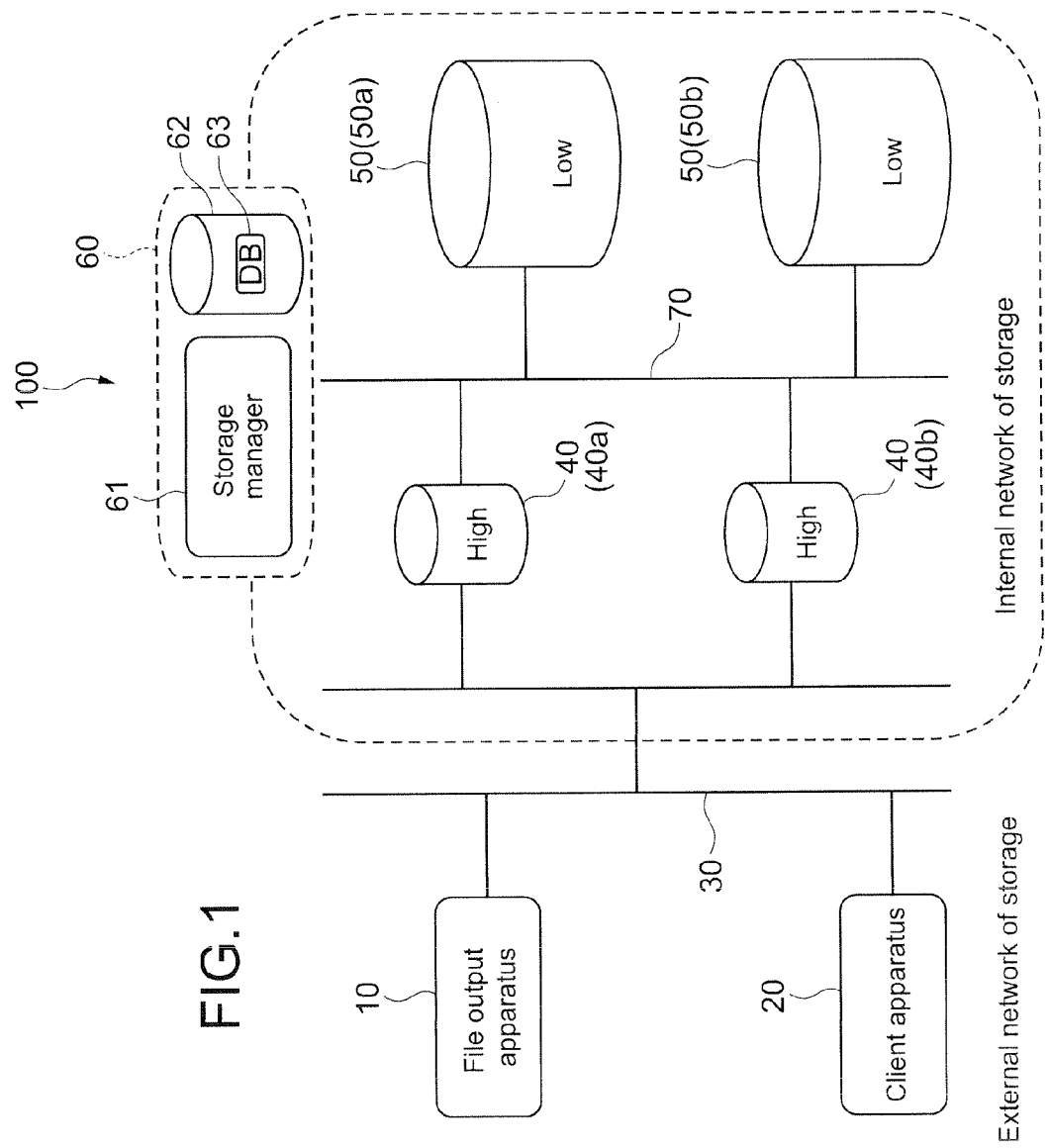
FIG. 1 is a schematic view showing a configuration example of an information processing system according to a first embodiment of the present disclosure.

FIG. 1 is a schematic view showing a configuration example of an information processing system according to a first embodiment of the present disclosure.

An information processing system 100 functions as a storage system. A file output apparatus 10 shown in FIG. 1 outputs material data such as video data and audio data to the information processing system 100.

An access request from a client apparatus 20 being an external apparatus to the material data stored on the information processing system 100 is transmitted. In response to the access request, the information processing system 100 outputs to the client apparatus 20 target data to be a target of the access request.

The client apparatus 20 of this embodiment performs, on the material data read from the information processing system 100, editing processing, preview processing, and the like. In this embodiment, a virtual environment or the like is used, so that the whole of the information processing system 100 is recognized by the client apparatus 20 as single storage.

In this embodiment, the information processing system 100, the file output apparatus 10, and the client apparatus 20 are connected to one another over network 30. As the network 30, for example, a local area network (LAN) or a wide area network (WAN) is used. However, the kind of the network 30, a protocol therefor, and the like are not limited. Alternatively, the information processing system 100, the file output apparatus 10, and the client apparatus 20 may be directly connected to one another without the network 30.

The information processing system 100 includes first nodes 40 serving as a first storage apparatus, second nodes 50 serving as a second storage apparatus, and a control apparatus 60 that controls respective operations of the first and second nodes 40 and 50. It should be noted that the first nodes 40 correspond to a first storage unit. Further, the second nodes 50 correspond to a second storage unit.

The first nodes 40, the second nodes 50, and the control apparatus 60 are connected to one another over a network 70. In FIG. 1, the state in which the control apparatus 60 controls the respective nodes 40 and 60 is shown and the control apparatus 60 is also connected to the network 70.

Although the network 70 is typically a LAN, the network 70 is not limited thereto. The network 70 is connected to the above-mentioned network 30. With this, the apparatuses of the information processing system 100, the file output apparatus 10, and the client apparatus 20 are connected to one another.

In this embodiment, two first nodes 40a and 40b and two second nodes 50a and 50b are used. However, the number of first nodes 40 and the number of second nodes 50 are not limited.

For each of the first nodes 40, the second nodes 50, and the control apparatus 60, for example, a computer such as a PC is used. Information processing by the first nodes 40, the second nodes 50, and the control apparatus 60 is realized by cooperation of software stored on a ROM or the like and a hardware resource such as a PC. Specifically, a CPU loads a program configuring the software stored on the ROM or the like into a RAM and executes it, to thereby perform the information processing.

The program is installed into each apparatus via, for example, a recording medium. Alternatively, the program may be installed over a global network or the like.

As shown in FIG. 1, the control apparatus 60 includes a storage manager 61 as a functional block. This is realized by, for example, the CPU in the control apparatus 60. Further, the control apparatus 60 includes a non-volatile storage device 62 constituted of, for example, a hard disk drive (HDD), a flash memory, and other solid-state memories. The storage device 62 stores a database 63 to which the storage manager 61 refers. The storage manager 61 refers to the database 63 to control each of the first and second nodes 40 and 50.

The first and second nodes 40 and 50 store at least part of the material data outputted from the file output apparatus 10. Then, according to the instruction from the storage manager 61, specified material data is read and outputted to a specified transfer destination.

Each of the first nodes 40 has a first output capability for storing and outputting the material data. Herein, the "output capability" means a capability relating to a response after reception of a transfer instruction of the stored material data. That is, this capability is defined by a time period from reception of an instruction to transfer material data (or part of material data) having a predetermined volume to a predetermined output destination to completion of transfer of the material data to the specified destination.

A fast-response storage apparatus has a high output capability and is referred to as a so-called high-bandwidth storage apparatus. A slow-response storage apparatus has a low output capability and is referred to as a so-called low-bandwidth storage apparatus.

The output capability is influenced by, for example, the kind of the storage device for storing the material data. For example, a storage apparatus installing a storage device having high I/O throughput has a higher output capability. As such a storage device, for example, a solid-state drive (SSD), a redundant arrays of inexpensive disks (RAID) device in which a plurality of discs are grouped by a RAID technique, or one in which discs are grouped by an internet small computer system interface (iSCSI) initiator.

As a storage device having I/O throughput lower than the one described above, there is a storage device using an HDD or a tape, for example.

Further, the output capability is influenced also by the kind of a network interface card (NIC) to be installed into each storage apparatus. For example, a storage apparatus installing an NIC of 10 G has a higher output capability than a storage apparatus installing an NIC of 1 G.

Additionally, the output capability may be influenced also by the kind of cables to be used for connection to the networks, processing speed of the CPU, and the like. That is, the output capability may depend on various conditions of the hardware and software. Therefore, as a result of considering other conditions in a comprehensive way, there may be a case where the storage apparatus installing the NIC of 1 G is determined to have a higher output capability than the storage apparatus installing the NIC of 10 G, for example.

In this embodiment, the first nodes 40 each having a first output capability and the second nodes 50 each having a second output capability lower than the first output capability are used. That is, the first nodes 40 have a faster response to the data transfer instruction than the second nodes 50. In FIG. 1, the state in which the first nodes 40 each have a high bandwidth and the second nodes each have a low bandwidth is shown.

It should be noted that the first and second output capabilities only need to be relatively compared. That is, it is unnecessary to define a reference for defining the first and second output capabilities. As a result of relatively comparing the output capabilities of the storage apparatuses, the storage apparatus having a higher output capability only needs to be used as the first node 40 having the first output capability. Similarly, the storage apparatus having a lower output capability only needs to be used as the second node 50 having the second output capability.

In general, in many cases, the high-bandwidth storage apparatus is expensive and has a lower storage capacity and the low-bandwidth storage apparatus is not expensive and has a higher storage capacity. For example, by constituting the storage system of a plurality of high-bandwidth storage apparatuses, high-speed transfer of the material data to the client apparatus becomes possible. However, in many cases, it is difficult to do so in terms of costs and the like.

Thus, in this embodiment, by appropriately combining the high-bandwidth storage apparatus and the low-bandwidth storage apparatus, the storage system that makes efficient access possible is realized. As a result, it becomes also possible to reduce the costs.

The degree of output capability of the storage apparatus to be used for the high-bandwidth first node 40 and the degree of output capability of the storage apparatus to be used for the low-bandwidth second node 50 only need to be appropriately set. For example, the first and second nodes 40 and 50 only need to be appropriately selected so that desirable values of access speed to the material data, cost performance, and the like are obtained.

Therefore, for example, there may be a case where the storage apparatuses used as the first nodes in the information processing system according to embodiments of the present disclosure are used as the second nodes in other information processing systems according to embodiments of the present disclosure. In this case, a storage apparatus having a further higher output capability is used as the first node.

Off course, a reference for selecting the first and second nodes 40 and 50 may be appropriately set.

Further, in this embodiment, the two first nodes 40*a* and 40*b* are used. Those first nodes 40*a* and 40*b* do not need to be the same. Further, the first nodes 40*a* and 40*b* do not need to have the same output capability.

The same is applied to the two second nodes 50*a* and 50*b*. That is, the first output capability and the second output capability may be each defined with some differences. For example, it is assumed that four storage apparatuses having a sequentially increased output capabilities are provided. In this case, the storage apparatus having the highest output capability and the storage apparatus having the second highest output capability may be used as the first nodes 40*a* and 40*b*. The remaining two storage apparatuses may be used as the second nodes 50*a* and 50*b*.

[Operation of Information Processing System]

Figure 2:
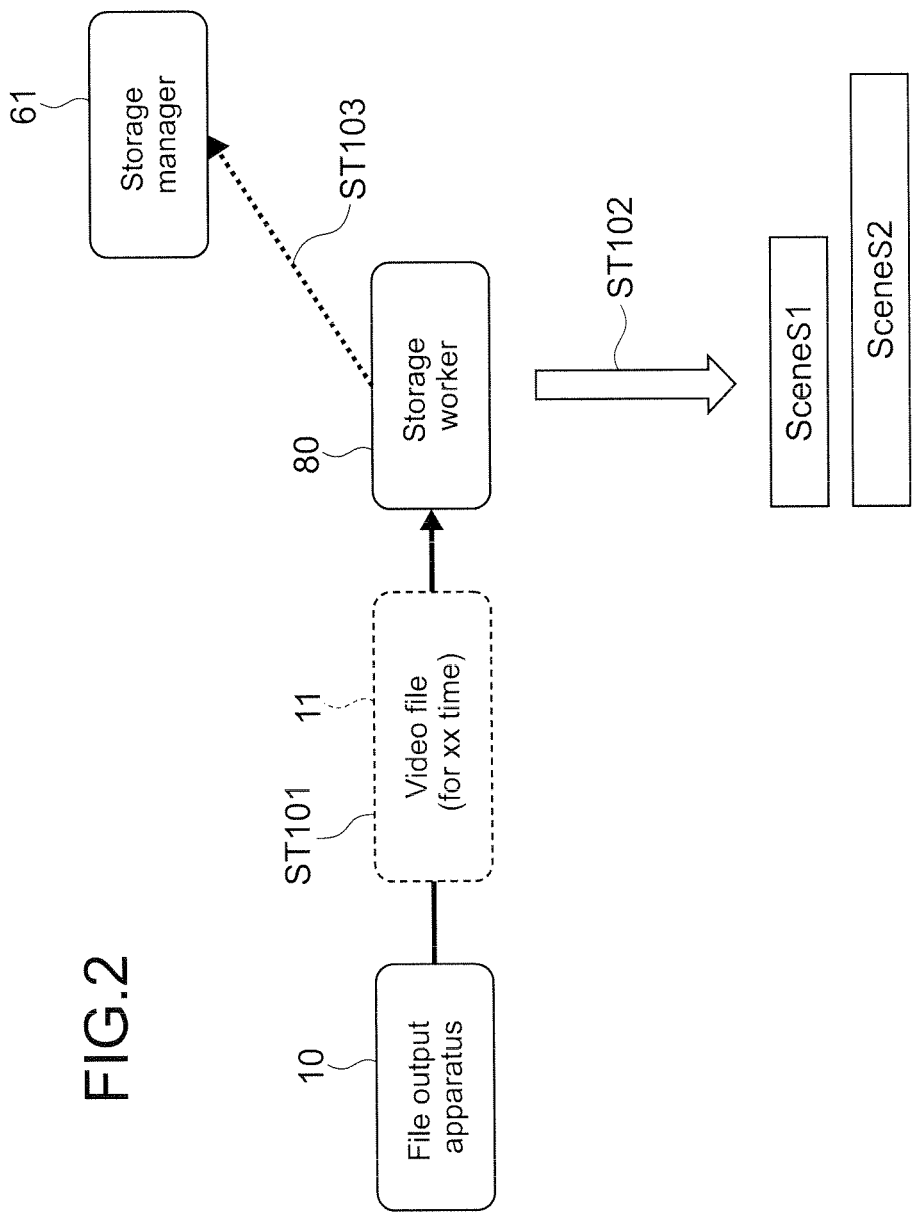
FIG. 2 is a schematic view showing an example of a flow of capture processing of material data outputted from a file output apparatus shown in FIG. 1.
Figure 3:
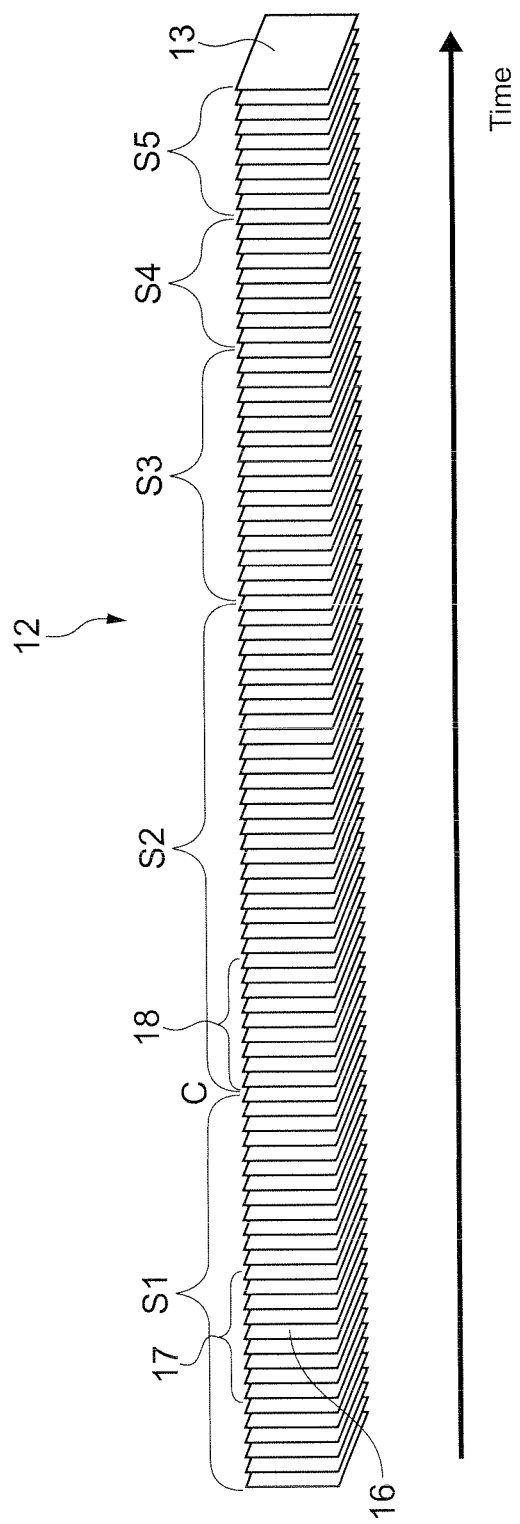
FIG. 3 is a schematic view showing the material data to be captured in this embodiment.

Capture processing on the material data outputted from the file output apparatus 10 will be described. FIG. 2 is a schematic view showing one example of a flow of the capture processing. FIG. 3 is a schematic view showing the material data to be captured in this embodiment.

Temporarily Temporally consecutive data is outputted from the file output apparatus 10 to the information processing system 100 as the material data (Step 101). In this embodiment, as shown in FIG. 2, the video file 11 is outputted to the information processing system 100.

The video file 11 stores moving-image data 12 corresponding to a predetermined period of time. As shown in FIG. 3, the moving-image data 12 is constituted of a plurality of temporally consecutive frame images 13. The frame images 13 are generated at a frame rate of 30 fps (frame per second) or 60 fps, for example. Actually, in many cases, a larger number of frame images 13 than as shown in FIG. 3 are captured.

As shown in FIG. 3, a plurality of frame images 13 are generated along a time axis. That is, the frame images 13 located on a left-hand side as viewed in FIG. 3 correspond to a first half of the moving-image data 12 and the frame images 13 located on a right-hand side correspond to a second half of the moving-image data 12.

A storage worker 80 performs grouping processing on the moving-image data 12. The storage worker 80 is a collective term of the nodes 40 and 50 shown in FIG. 1. In this embodiment, the first node 40*a* shown in FIG. 1 groups the plurality of frame images 13 into a plurality of groups based on a reference defined in advance (Step 102).

The reference defined in advance according to this embodiment is grouping for each scene. Therefore, as shown in FIG. 3, the plurality of frame images 13 are grouped into a plurality of scenes S1 to S5. The plurality of scenes S1 to S5 as the plurality of groups each include at least one or more of the frame images 13.

The grouping processing into the plurality of scenes S1 to S5 is performed by, for example, calculating a difference between two adjacent frame images 13. When the difference between the two frame images 13 is larger than a predetermined threshold, a point between the two frame images 13 is determined as a scene change point C. Then, at the scene change point C, the frame images 13 are grouped into the plurality of scenes S1 to S5. Otherwise, generally known scene change detection processing may be appropriately used.

For example, it is assumed that the material data is news video data. Further, it is assumed that the video data includes a scene where a newscaster broadcasts news at a studio, a scene where a landscape associated with the news is shown, and a scene where a news reporter in front of the landscape is zoomed in. In such a case, by performing the grouping processing, the material data is grouped into a plurality of scenes of the studio scene, the landscape scene, and the news reporter scene.

The first node 40*a* that has performed the grouping processing transmits information on the grouping result to the storage manager 61 (Step 103). The storage manager 61 stores a management table based on the information on the grouping result on the storage device 62 as the database 63.

The moving-image data 12 grouped into the plurality of scenes S1 to S5 is distributed to the first nodes 40a and 40b and the second nodes 50a and 50b. In this embodiment, first, the whole of the moving-image data 12 is stored on the first node 40a that performs the grouping processing. The storage manager 61 determines storage destinations of the respective scenes S1 to S5 based on the information on the grouping result. Then, according to an instruction of the storage manager 61, the plurality of scenes S1 to S5 are re-arranged.

For example, based on the positions of the scenes S1 to S5 in the moving-image data 12, the data volume of the scenes S1 to S5, the storage capacity of the nodes 40 and 50, the output capability of the nodes 40 and 50, the number of nodes 40 and 50, or the like, the distribution positions of the plurality of scenes S1 to S5 may be appropriately determined.

Information on the distribution positions of the plurality of scenes S1 to S5 is transmitted to the storage manager 61. The storage manager 61 stores the information on the distribution positions on the storage device 62. Therefore, the storage manager 61 is capable of managing which data of the scenes S1 to S5 is arranged in any one of the nodes 40 and 50.

Before the whole of the moving-image data 12 is stored on the first node 40a, arrangement destinations of scenes each determined as a group may be sequentially determined. Then, the scenes may be sequentially transferred to the determined arrangement destinations.

Alternatively, the plurality of grouped scenes S1 to S5 are arranged in predetermined distribution positions of the first and second nodes 40 and 50. The predetermined distribution positions are set as default, for example. From this state, according to the instruction of the storage manager 61, the plurality of scenes S1 to S5 may be re-arranged.

Figure 4:
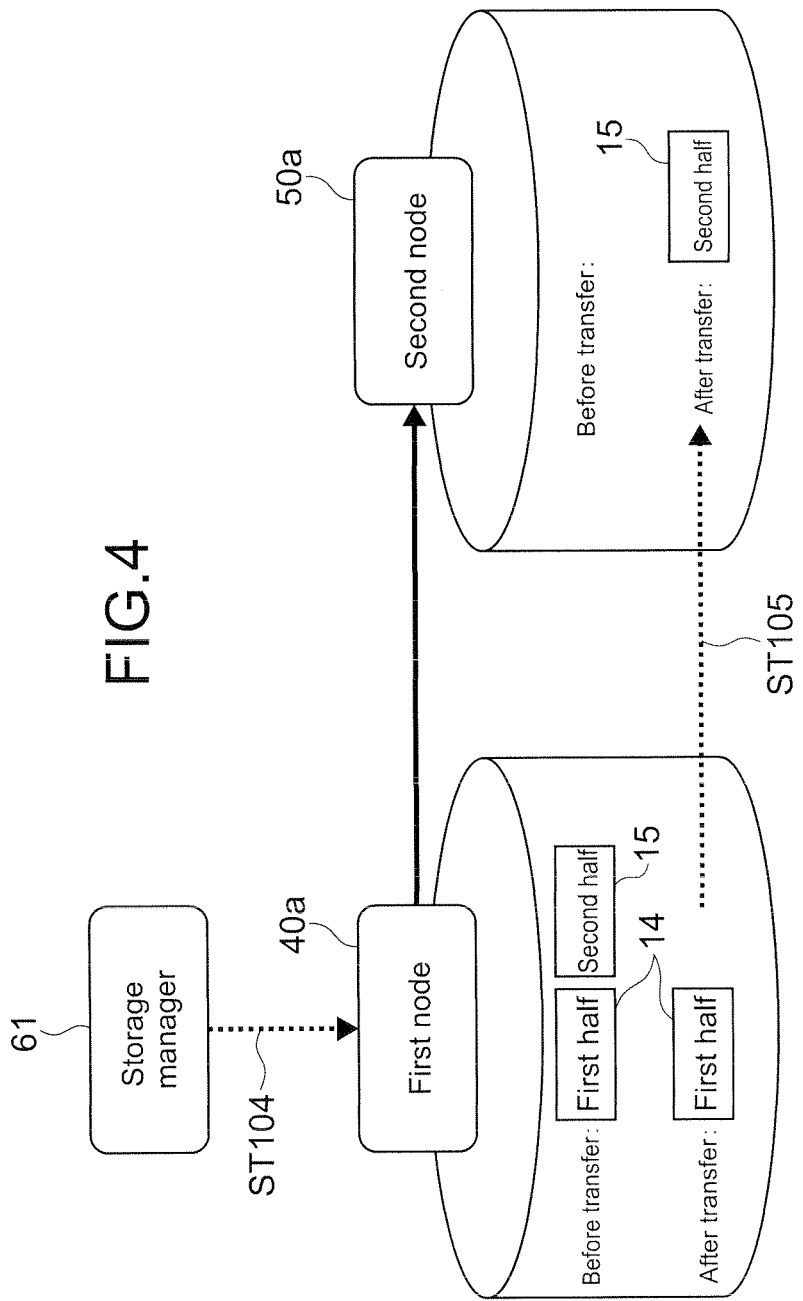
FIG. 4 is a schematic view showing an example of a flow of distribution processing on a plurality of grouped scenes according to this embodiment.
Figure 5:
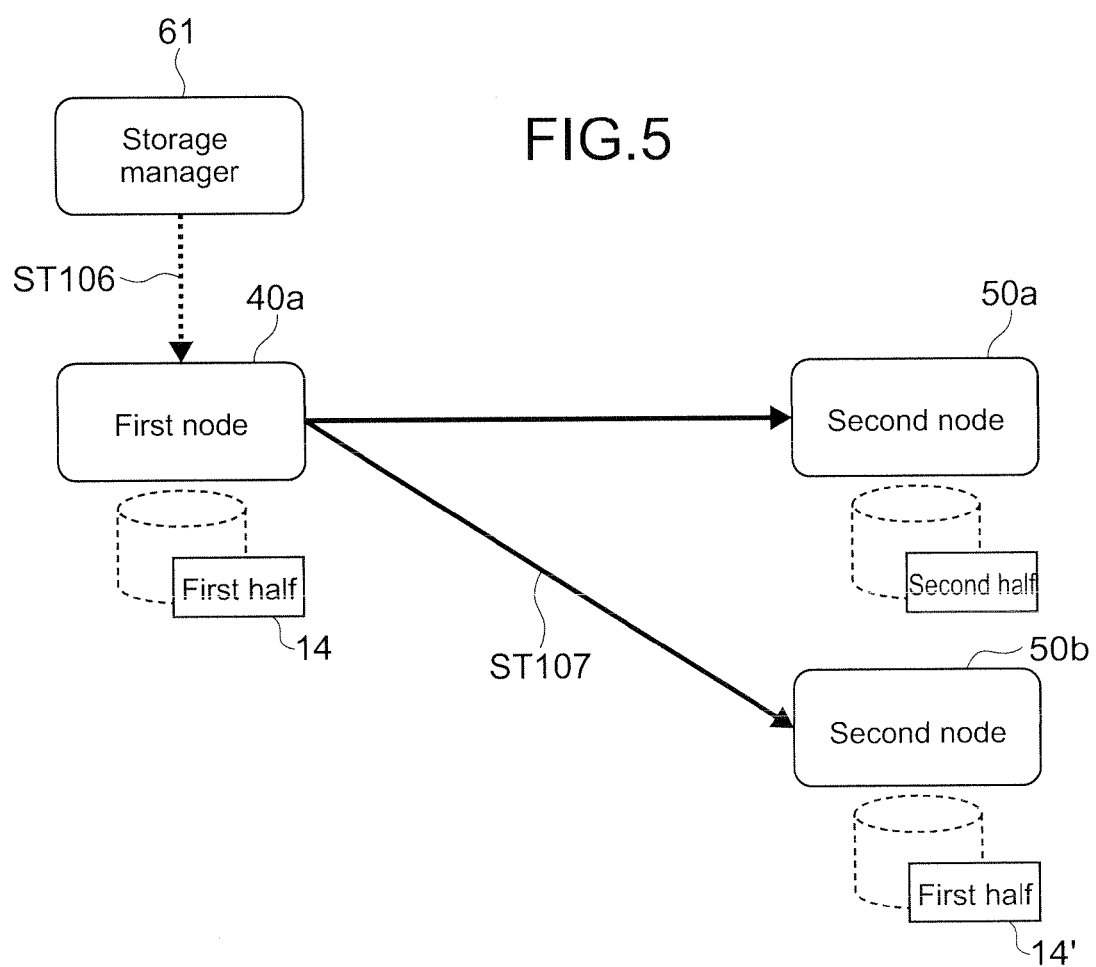
FIG. 5 is a schematic view showing the example of the flow of the distribution processing on the plurality of grouped scenes according to this embodiment.
Figure 6:
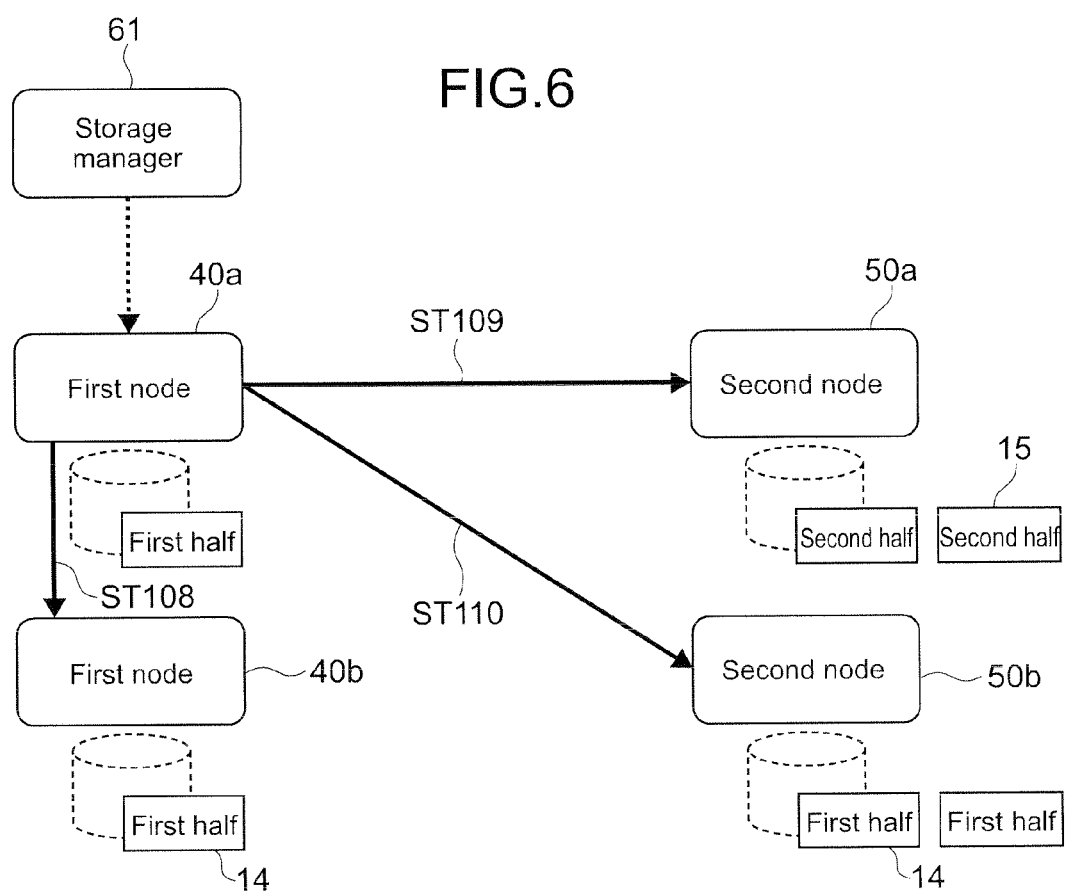
FIG. 6 is a schematic view showing the example of the flow of the distribution processing on the plurality of grouped scenes according to this embodiment.

FIGS. 4 to 6 are schematic views each showing one example of a flow of the distribution processing on the plurality of grouped scenes S1 to S5.

In this embodiment, each of the scenes S1 to S5 is further divided into a first half 14 and a second half 15. The first half 14 and the second half 15 each include one or more of the frame images 13. Division ratio and the like of the first half 14 and the second half 15 may be appropriately set.

Depending on the data volume of the scenes S1 to S5, the storage capacity of the nodes 40 and 50, and the number of nodes 40 and 50, a single scene is divided into three or more parts. Alternatively, setting that a scene having large data volume is divided into three or more parts and a scene having small data volume is not divided may be made.

As shown in FIG. 4, a transfer instruction of the second half 15 of the scene S1 divided into two parts is outputted from the storage manager 61 to the first node 40a (Step 104). When receiving the transfer instruction, the first node 40a transfers the second half 15 of the scene S1 to the specified second node 50a as the transfer destination (Step 105).

As shown in FIG. 5, according to the instruction from the storage manager 61, the first node 40a creates a copy 14' of the first half 14 of the scene S1 and transfers the copy 14' of the first half 14 to the second node 50b (Steps 106 and 107).

Next, as shown in FIG. 6, according to the instruction of the storage manager 61, the first half 14 and the second half 15 of the scene S2 are arranged. In this embodiment, the first half 14 of the scene S2 is transferred from the first node 40a to the first node 40b (Step 108). Further, the second half 15 is transferred from the first node 40a to the second node 50a (Step 109). Then, the first half 14 is transferred from the first node 40a to the second node 50b (Step 110).

It should be noted that the data of the whole of the scene S2 may be transferred from the first node 40a to the first node 40b. Then, the first node 40b that has received the instruction of the storage manager 61 may perform transfer processing on the first half 14 and the second half 15 of the scene S2.

Regarding the data of the scene S3 and the subsequent scenes, the first half 14 and the second half 15 of each of those scenes are appropriately arranged in the second nodes 50a and 50b.

The arrangement positions of the respective scenes S1 to S5 when the moving-image data 12 is captured are not limited. In the information processing system 100 according to this embodiment, the first nodes 40 each having a high output capability are mainly used for cache. Further, the second nodes 50 each having a low output capability are mainly used for storage of the material data.

Therefore, the first half 14 of the scene S1, to which a first access request is highly likely to be transmitted from the client apparatus 20, is stored on the first node 40a. Further, the first half 14 of the subsequent scene S2 is stored on the first node 40b. Thus, the efficient access is realized. However, the present disclosure is not limited thereto.

Figure 7:
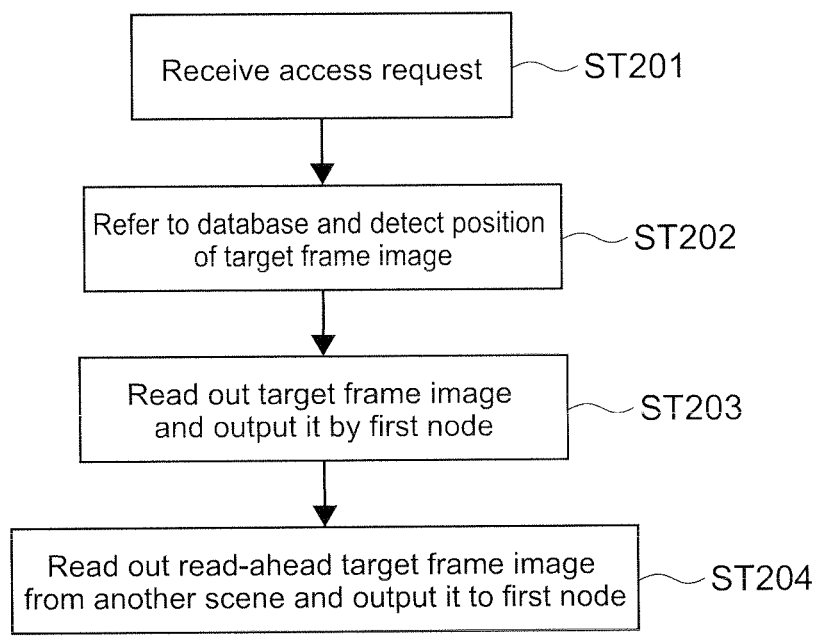
FIG. 7 is a flowchart showing a basic flow of data output processing of the information processing system in this embodiment.
Figure 8:
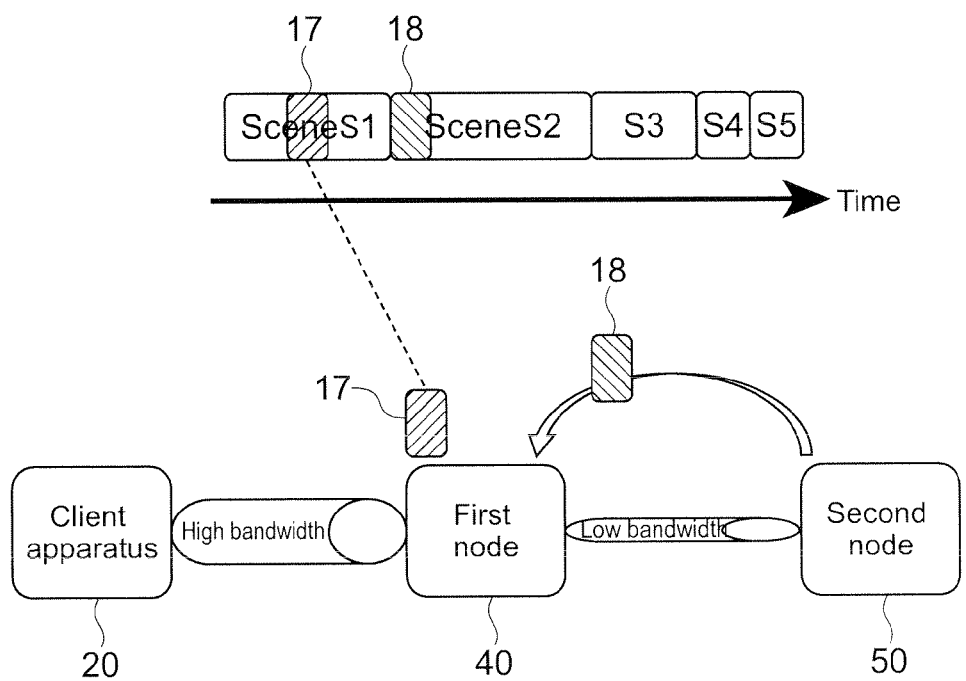
FIG. 8 is a view for explaining the flowchart shown in FIG. 7.
Figure 9:
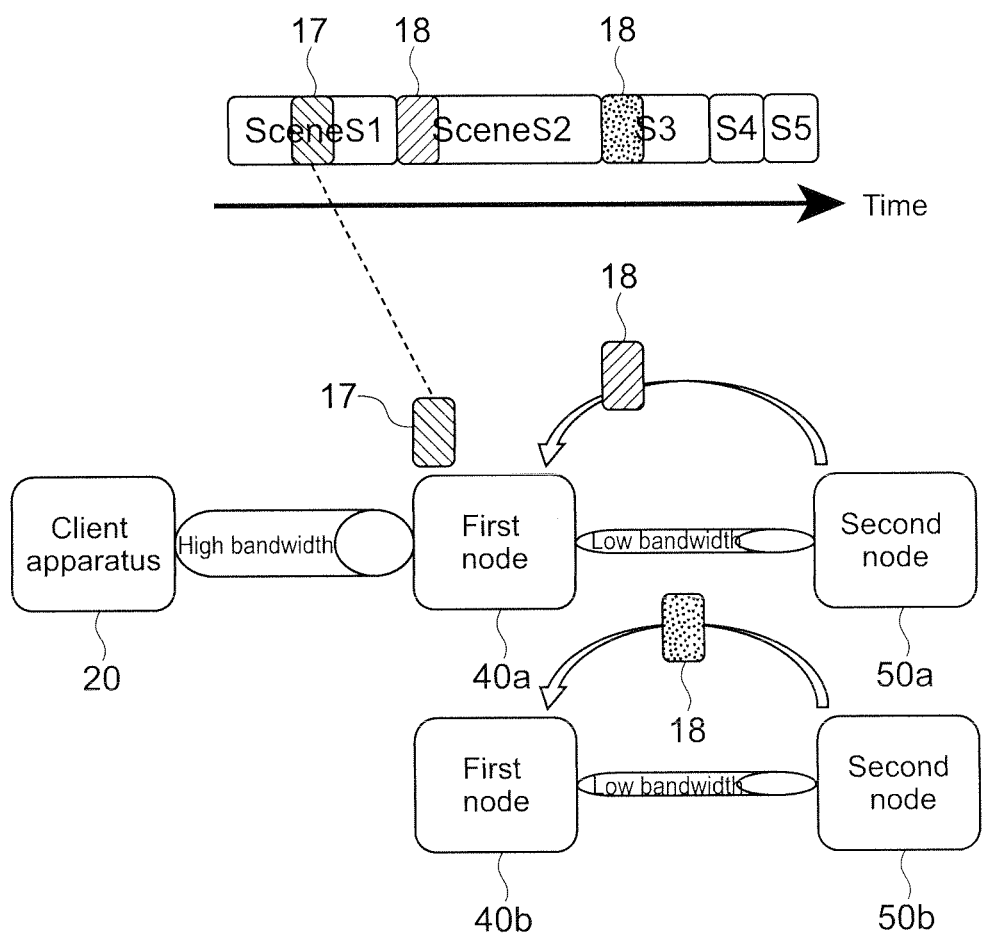
FIG. 9 is a view for explaining the flowchart shown in FIG. 7.

The method of outputting the moving-image data 12 to the client apparatus 20 by the information processing system 100 will be described. FIG. 7 is a flowchart showing a basic flow of data output processing of the information processing system 100 in this embodiment. FIGS. 8 and 9 are schematic views for explaining the flow.

In the information processing system 100, according to the access request from the client apparatus 20, the target data to be the target of the request is read from a first group including the target data and outputted to the client apparatus 20.

As shown in FIG. 7, the access request transmitted from the client apparatus 20 is received by the storage manager 61 (Step 201). Here, it is assumed that the client apparatus 20 receives the access request to the frame image 13 of the scene S1.

The storage manager 61 reads the target frame image 16 to be the target of the access request (see FIG. 3) from the scene S1 including the target frame image 16 and causes the first node 40 to output the target frame image 16 to the client apparatus 20. The scene S1 including the target frame image 16 corresponds to the above-mentioned first group.

Specifically, the storage manager 61 refers to the stored database 63 and detects the arrangement position of the target frame image 16 (Step 202). Then, an instruction to transfer the target frame image to the high-bandwidth first node 40 is transmitted to the node 40 or 50 on which the target frame image 16 is stored. It should be noted that in the case where the target frame image 16 is arranged in the first node 40, the transfer instruction is not made.

The instruction to output the target frame image 16 to the client apparatus 20 is transmitted from the storage manager 61 to the first node 40. With this, the target frame image 16 is outputted from the first node 40 to the client apparatus 20 (Step 203).

In response to the reading of the target frame image, in this embodiment, the following data is transferred to the first node 40. These are data to be cached in the first node 40 in response to the reading of the target frame image 16.

First, as shown in FIG. 8, block data 17 including the target frame image 16 in the scene S1 is transferred to the first node 40. The block data 17 is data including the target frame image 16 and the neighborhood frame images 13 consecutive from the target frame image 16 (see FIG. 3). The transfer of the block data 17 may be performed parallel to the reading of the target frame image 16.

The block data 17 is cached so that reading or the like of the frame images 13 along the time axis, which is necessary for a normal reproduction mode, can be performed at high speed, for example. It should be noted that, as the block data 17, the first half 14 or the second half 15 shown in FIG. 4 and the like may be transferred. Alternatively, the volume of the block data 17 may be appropriately defined upon caching.

As shown in FIG. 8, in this embodiment, at least part of data is read as the read-ahead target data from a second group different from the above-mentioned first group. That is, block data 18 is read as one or more read-ahead target frame images (see FIG. 3) from the scene S2 different from the scene S1. Although the scene S2 is selected as the different scene in this embodiment, the present disclosure is not limited thereto. Further, although the block data 18 located in the first half of the scene S2 is read, the present disclosure is not limited thereto.

The block data 18 is read from the second node 50 and transferred to the first node 40 (Step 204). Then, the block data 18 is stored on the first node 40. These operations are performed according to instructions from the storage manager 61.

It should be noted that Step 204 in FIG. 7 is not necessarily performed after the output processing in Step 203. At approximately the same time as or before the target frame image 16 is outputted to the client apparatus 20, Step 208 may be performed in response to the reading of the target frame image 16. Alternatively, at approximately the same time as the reading of the target frame image 16, Step 208 may be performed.

As shown in FIG. 9, by appropriately using the two first nodes 40a and 40b and the two second nodes 50a and 50b, the read-ahead cache processing as described above may be performed.

First, the block data 17 including the target frame image 16 is transferred to the first node 40a. Then, the block data 18 in the scene S2 as the read-ahead target frame image is transferred to the first node 40a. In addition, the block data 18 located in the first half of the scene S3 is transferred to the first node 40b as the read-ahead target frame image.

By using the plurality of the first nodes 40a and 40b in this manner, it becomes possible to widen a setting range of the volume and kind of the data to be read as the read-ahead frame image. With this, the efficient access becomes possible.

It should be noted that only the block data 18 of the scene S1 may be stored on the first node 40a and the block data 18 of the scene S2 may be stored on the first node 40b. Also in this case, the block data 18 of the different scene S2 is stored on the first node 40.

Further, three pieces of block data 17 and 18 relating to the scenes S1 to S3 may be stored on the first node 40a. Off course, a scene other than the scenes S2 and S3 may be selected as the different scene and the read-ahead target frame image may be read from the different scene.

As described above, in the information processing system 100 according to this embodiment and the information processing method to be executed by the information processing system 100, the temporally consecutive data is grouped into the plurality of groups based on the reference defined in advance and stored. Then, the target data to be the target of the access request is read from the first group and outputted. In response to the reading of the target data, the read-ahead target data is read from the second group different from the first group. Therefore, by appropriately setting the reference and appropriately grouping the consecutive data, it is possible to realize the storage system that makes the efficient access possible.

In this embodiment, the plurality of temporally consecutive frame images 13 as the temporally consecutive data are stored as the moving-image data 12. In recent years, the moving-image data 12 has increased in volume. For such large-volume data, it becomes possible to realize the storage system that makes the efficient access possible.

Further, in this embodiment, the first node 40 having the first output capability and the second node 50 having the second output capability lower than the first output capability are used. Then, the target frame image 16 stored on the first node 40 having the higher output capability is outputted to the client apparatus 20. Further, the read-ahead target frame image stored on the second node 50 having the lower output capability is stored on the first node 40. With this, the efficient access becomes possible. Further, it is possible to reduce the costs necessary for realizing the storage system.

In this embodiment, the plurality of frame images 13 are grouped into the plurality of scenes S1 to S5 and stored. For example, the plurality of frame images 13 are accessed for each of the scenes S1 to S5 in many cases. Therefore, by performing such grouping, prediction accuracy of read-ahead cache is enhanced and the efficient access becomes possible.

For example, it is assumed that linear read-ahead processing along the time axis is performed with the target data to be the target of the access request being the reference. That is, it is assumed that only the block data 17 including frame images 10 minutes before and 10 minutes later is cached with the target frame image 16 being the reference.

In such a case, if a user who uses the client apparatus 20 desires to change to a different scene, it is likely that the cached block data 17 becomes useless. In this case, the frame images 13 of the different scene have to be read from the low-bandwidth node, which makes it difficult to perform access processing at high speed. In this embodiment, it is possible to realize the storage system that enables high-speed access to be achieved for the change to the different scene.

Further, in this embodiment, the two first nodes 40a and 40b and the two second nodes 50a and 50b are used. However, off course, two or more first nodes 40 and two or more second nodes 50 may be used.

For example, in the case where the storage system available for editing a video is realized, the moving-image data has large volume, and hence a number of nodes may be necessary. In this case, it is difficult to constitute all the nodes of high-bandwidth nodes in terms of costs. Therefore, low-bandwidth nodes are often mixed.

Under such circumstances, for example, the low-bandwidth nodes become bottlenecks and it may be difficult to achieve high throughput as the whole of the storage system. Also, there is a fear that concentration of data access to a certain node causes this node to be a bottleneck. That is, in video production under large-volume data and distributed-storage circumstances, it is a key point to efficiently retrieve desired data.

As described above, in the information processing system 100 according to this embodiment, it is possible to realize the storage system that makes the efficient access possible, and hence to prevent the problems as described above.

As shown in FIG. 1, the first node 40b and the second node 50b are arranged to be parallel to the first node 40a and the second node 50a. Further, the first nodes 40 and the second nodes 50 are hierarchically arranged with respect to the client apparatus 20.

With this arrangement configuration, by, for example, sequentially linking the first and second nodes 40 and 50 in parallel, systematic scale-up can be easily performed. Further, algorithm for controlling a larger number of first and second nodes 40 and 50 can be also structured without needing a significant change. Further, by increasing the number of first and second nodes 40 and 50, it becomes possible to capture larger-volume material data, and hence also to increase the access speed.

Figure 10:
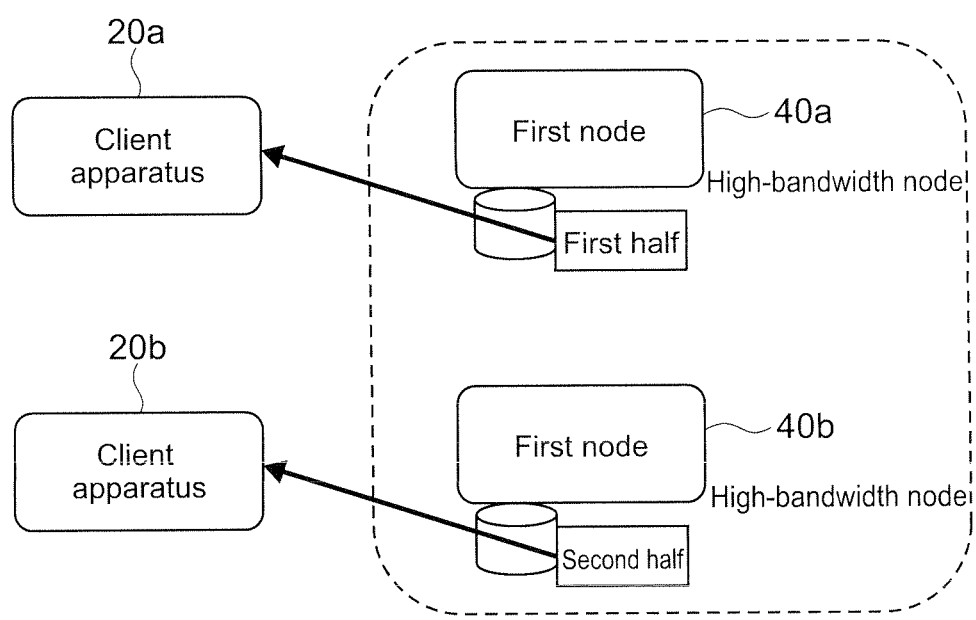
FIG. 10 is a view for explaining one of effects obtained when the number of first and second nodes is increased in this embodiment.

In addition, by increasing the number of first and second nodes 40 and 50, the efficient access by a plurality of the client apparatuses 20 to the material data becomes possible. For example, as shown in FIG. 10, to each of client apparatuses 20*a* and 20*b*, the first nodes 40*a* and 40*b* to be used also for cache can be distributed. That is, even if concurrent access by the plurality of the client apparatuses 20 occurs, it is possible to prevent generation of a node to be a bottleneck.

Further, by using the plurality of the nodes 40 and 50, risks due to breakdown of the nodes and the like can be dispersed. That is, in the case where the storage system is constituted of a single high-performance node, the storage system is stopped if the node breaks down. In addition, a new high-performance node takes a high cost. However, in this embodiment, even if one node breaks down, another node can maintain the storage system. Further, for example, in the case where the low-bandwidth node breaks down, the cost for a new node is lower.

Second Embodiment

An information processing system according to a second embodiment of the present disclosure will be described. Hereinafter, descriptions of the same configurations and actions as in the information processing system 100 of the above-mentioned embodiment will be omitted or simplified.

In the information processing system according to this embodiment, a client apparatus transmits use mode information of a target frame image. The use mode information of the target frame image is information showing how to use the target frame image by the client apparatus. For example, information on various modes regarding reproduction and editing of the target frame image is transmitted to a storage manager.

Examples of such modes may include various modes such as a preview reproduction mode, a double-speed reproduction mode, a triple-speed reproduction mode, a digest reproduction mode, and an effect edit mode. In each reproduction mode, the forward direction and the backward direction may be set as different modes.

When receiving the use mode information, the storage manager reads a read-ahead target frame image based on the information. That is, read-ahead cache processing suitable for each use mode is realized so that the efficient access becomes possible. Now, this will be described in detail.

Figure 11:
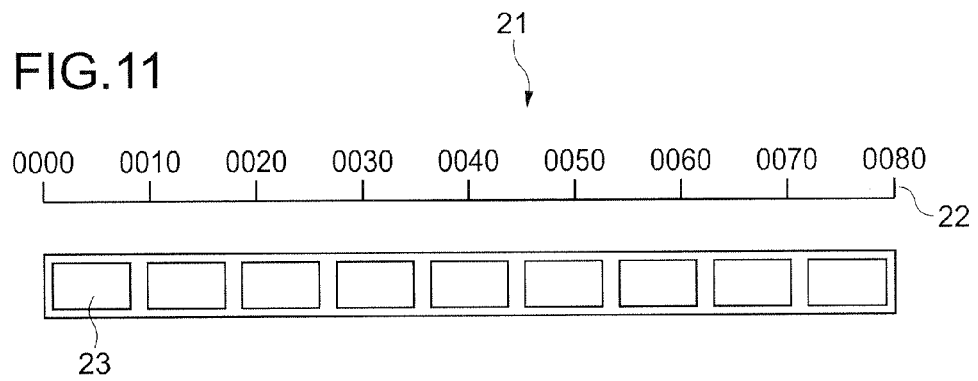
FIG. 11 is a schematic view showing one example of a UI displayed by a display unit of a client apparatus in a second embodiment of the present disclosure.

FIG. 11 shows a UI 21 to be displayed by a display unit of a client apparatus. As shown in the figure, thumbnail images 23 for each of grouped scenes may be displayed along a time line 22. The thumbnail images 23 are generated by, for example, compressing a head frame image of each of the scenes.

Information on the UI 21 including the thumbnail images 23 is generated by the storage manager. Then, the information is transmitted to the client apparatus as metadata of captured material data. In this manner, the information on the grouping of the material data may be transmitted to the client apparatus.

The user can perform reproduction and editing of the moving-image data while viewing the UI 21. The information on the grouping is not limited to the thumbnail images 23. For example, time information of a scene change point may be used.

Figure 12A:
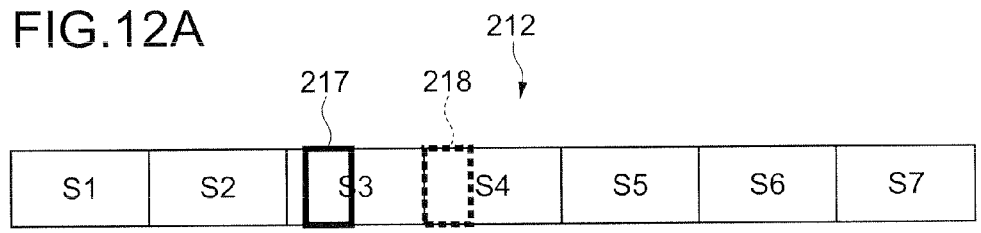
FIGS. 12A and 12B are schematic views each showing moving-image data captured in this embodiment.
Figure 12B:
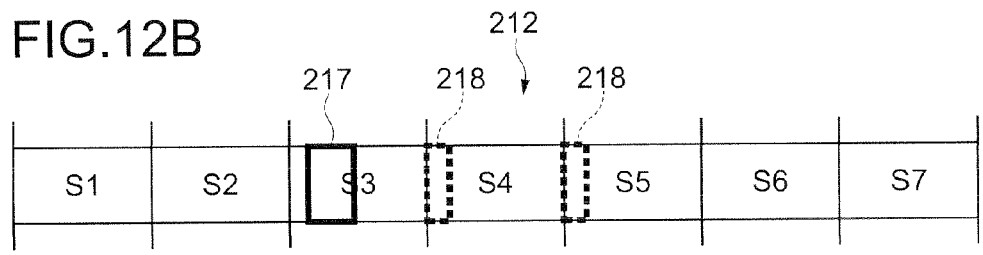

FIGS. 12A and 12B are schematic views each showing moving-image data 212 captured in this embodiment. In this embodiment, for the sake of description, it is assumed that the moving-image data 212 grouped into seven scenes S1 to S7 is captured. The scenes S1 to S7 each include the same number of frame images. Therefore, the scenes have an equal length.

Further, the solid frame on the moving-image data 212 shown in each of FIGS. 12A and 12B indicates block data 217 including a target frame image to be a target of an access request. On the other hand, the dashed frames on the moving-image data 212 each indicate block data 218 as a read-ahead target frame image to be read from a different scene.

The block data 217 is block data linearly predicted from the target frame image. Hereinafter, this block data 217 is referred to as linear block data 217. On the other hand, the block data 218 to be read ahead from the different scene is referred to as read-ahead block data 218.

Further, respective pieces of the block data and ratio thereof are expressed as follows:
  linear block data in scene SX (X=1 to 7) is LX;
  read-ahead block data in scene SX (X=1 to 7) is FX; and
  ratio is (LX, FX)=(ratio).

For example, the state shown in FIG. 12A is expressed by (L3, F4)=(1, 1).

Further, the state shown in FIG. 12B is expressed by (L3, F4, F5)=(2, 1, 1).

The linear block data 217 and the read-ahead block data 218 that are expressed in this manner are cached by a high-bandwidth first node.

FIGS. 13A to 15B are schematic views each showing an example of read-ahead cache processing depending on the use mode of the target frame image. In each of the examples of FIGS. 13A to 15B, a case where the client apparatus transmits an access request to a frame image in the scene S3 is shown.

Figure 13A:
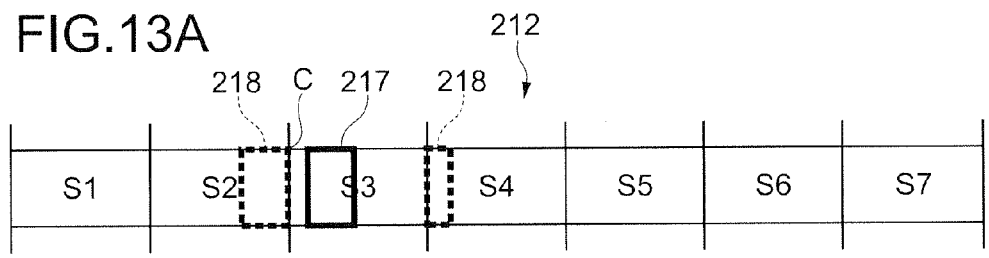
FIGS. 13A and 13B are schematic views each showing an example of read-ahead cache processing depending on a use mode of a target frame image according to this embodiment.
Figure 13B:
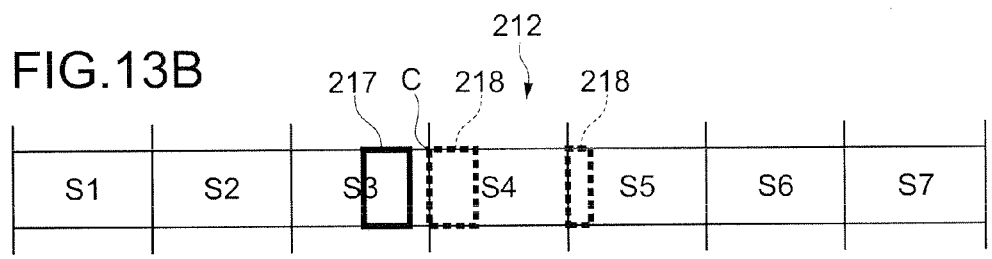

FIGS. 13A and 13B are schematic views each showing read-ahead cache processing in the case where the use mode information of the target frame image is the effect edit mode. Herein, the effect edit mode is a mode in which the editing processing is performed for each of the scenes S1 to S7. For example, processing of changing a color setting for each scene is assumed. However, the contents of editing are not limited and any editing processing may be performed for each of the scenes S1 to S7.

FIG. 13A is a view in the case where the target frame image is located in the first half of the scene S3. In this case, the linear block data 217 located in the first half of the scene S1 is read. Further, the read-ahead block data 218 located in the second half of the scene S2 and the read-ahead block data 218 located in the first half of the scene S4 are cached. The ratio of the respective block data is expressed by (F2, L3, F4)=(2, 2, 1).

In the effect edit mode in which the editing processing for each of the scenes is performed, the editing processing is performed at the scene change point C in many cases. Therefore, the second half of the scene S2 that is a scene immediately before the scene S3 and the first half of the scene S4 that is a scene immediately after the scene S3 are cached. Further, the target frame image is located in the first half of the scene S3, and hence the read-ahead block data 218 of the scene S2 is cached more than the read-ahead block data 218 of the scene S4.

FIG. 13B is a view in the case where the target frame image is located in the second half of the scene S3. In this case, the linear block data 217, the read-ahead block data 218 located in the first half of the scene S4, and the read-ahead block data 218 located in the first half of the scene S5 are cached. The ratio of the respective block data is expressed by (L3, F4, F5)=(2, 2, 1).

In the case of FIG. 13B, the first half of the scene S4 that is a scene immediately after the scene S3 and the first half of the scene S5 that is a second scene following the scene S3 are cached. Then, the block data 218 of the scene S4 closer to the target frame image is more cached. In this example, it is assumed that the editing processing is chronologically performed. Therefore, the first half of the scene S5 that is a second scene following the scene S3 is cached. However, instead of the first half of the scene S5, the second half of the scene S2 that is a scene immediately before the scene S3 may be cached.

Figure 14A:
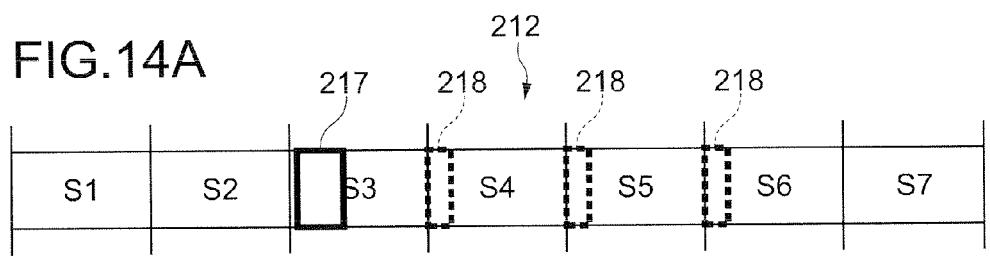
FIGS. 14A and 14B are schematic views each showing the example of the read-ahead cache processing depending on the use mode of the target frame image according to this embodiment.
Figure 14B:
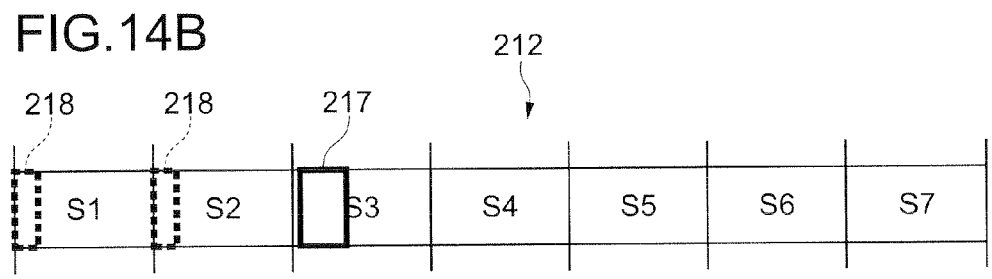

FIGS. 14A and 14B are schematic views each showing read-ahead cache processing in the case where the use mode information of the target frame image is the preview reproduction mode. Here, a reproduction mode in a forward direction is set. Further, in this reproduction mode, information on the scene including the frame image to which the access request has been made is used. That is, history information on reproduced scenes is created by the storage manager and stored on the storage device.

FIG. 14A is a view showing a case where the access request to the frame image of the scene S3 is transmitted when the frame image of the previous scene S2 is outputted. In this case, the linear block data 217 and the first half of each of the consecutive scenes S4 to S6 after the scene S3 (as read-ahead block data 218) are cached. The ratio thereof is expressed by (L3, F4, F5, F6)=(2, 1, 1, 1).

FIG. 14B is a view showing a case where the access request to the frame image of the scene S3 is transmitted when the frame image of the previous scene S4 is outputted. In this case, the linear block data 217 and the first half of each of the consecutive scenes S2 and S1 before the scene S3 (as read-ahead block data 218) are cached. The ratio thereof is expressed by (F1, F2, L3)=(1, 1, 2).

In the preview reproduction mode, many scene changes may be performed. Therefore, with respect to different scenes as many as possible, the frame images are cached ahead. It should be noted that in the example of FIG. 14B, there are only the scenes S1 and S2 before the scene S3. However, if there is a further scene, the three scenes are read ahead as shown in the example of FIG. 14A.

Further, the examples of FIGS. 14A and 14B relate to the reproduction mode in the forward direction, and hence the first half of each of the scenes is cached as the read-ahead block data 218. Then, based on a position relationship with the previously reproduced scene, it is determined whether consecutive scenes after the scene S3 are read ahead or consecutive scenes before the scene S3 are read ahead.

Figure 15A:
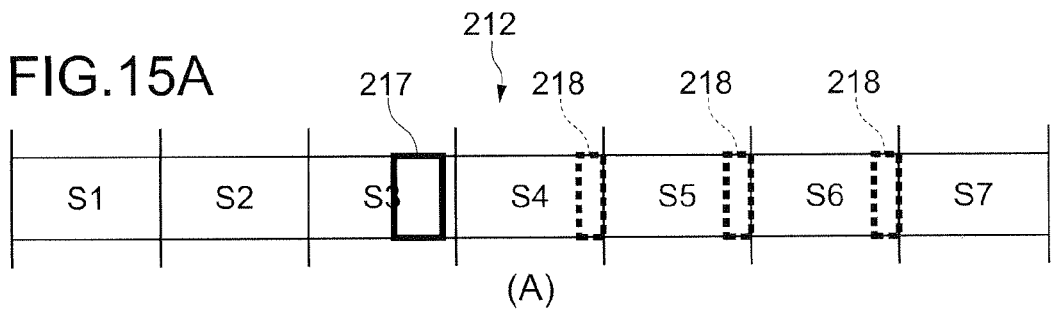
FIGS. 15A and 15B are schematic views each showing the example of the read-ahead cache processing depending on the use mode of the target frame image according to this embodiment.
Figure 15B:
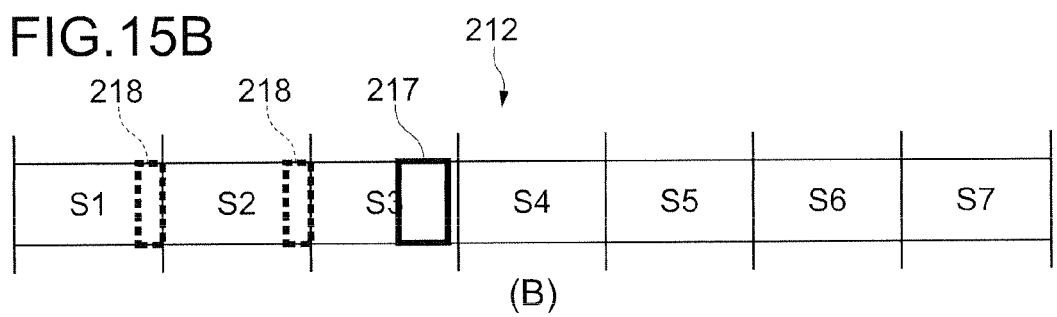

FIGS. 15A and 15B are schematic views each showing the read-ahead cache processing in the case where the use mode information of the target frame image is the preview reproduction mode (backward direction). Also in this reproduction mode, the history information of the reproduced scene is used.

FIG. 15A is a view showing a case where the access request to the frame image of the scene S3 is transmitted when the frame image of the previous scene S2 is outputted. In this case, the linear block data 217 and the second half of each of the consecutive scenes S4 to S6 after the scene S3 (as read-ahead block data 218) are cached. The ratio thereof is expressed by (L3, F4, F5, F6)=(2, 1, 1, 1).

FIG. 15B is a view showing a case where the access request to the frame image of the scene S3 is transmitted when the frame image of the previous scene S4 is outputted. In this case, the linear block data 217 and the second half of each of the consecutive scenes S2 and S1 before the scene S3 (as read-ahead block data 218) are cached. The ratio thereof is expressed by (F1, F2, L3)=(1, 1, 2).

In these examples, because of the reproduction mode in the backward direction, the second half of each of the scenes is cached as the read-ahead block data 218. Then, based on a position relationship with the previously reproduced scene, it is determined whether the consecutive scenes after the scene S3 are read ahead or the consecutive scenes before the scene S3 are read ahead.

Otherwise, for example, in the case where the double-speed reproduction mode or the triple-speed reproduction mode is set as the use mode, the following read-ahead cache processing may be performed. Specifically, in the case of the double-speed reproduction mode or the like, a fewer scene change instructions can be considered to be made, and hence the ratio of the read-ahead cache from the different scenes is decreased and the ratio of the linear block data 217 is increased. According to such a setting, the read-ahead cache processing may be performed.

Further, in the case where the digest reproduction mode is set as the use mode, data of middle part of each of the scenes may be cached as the read-ahead block data 218. This is based on conception that the middle part of each scene is highly likely to contain a main video.

As described above, in the information processing system according to this embodiment and the information processing method to be executed by the information processing system, based on the use mode information received from the client apparatus, the read-ahead target frame image is appropriately read. With this, the read-ahead cache processing suitable for each use mode is realized and the efficient access becomes possible.

It should be noted that the selection method for the read-ahead block data 218 and the ratio of the respective block data that are described above are not limited. The cache method for the read-ahead block data 218, which is optimal in accordance with handling of the material data by the client apparatus may be appropriately set.

Third Embodiment

Figure 16:
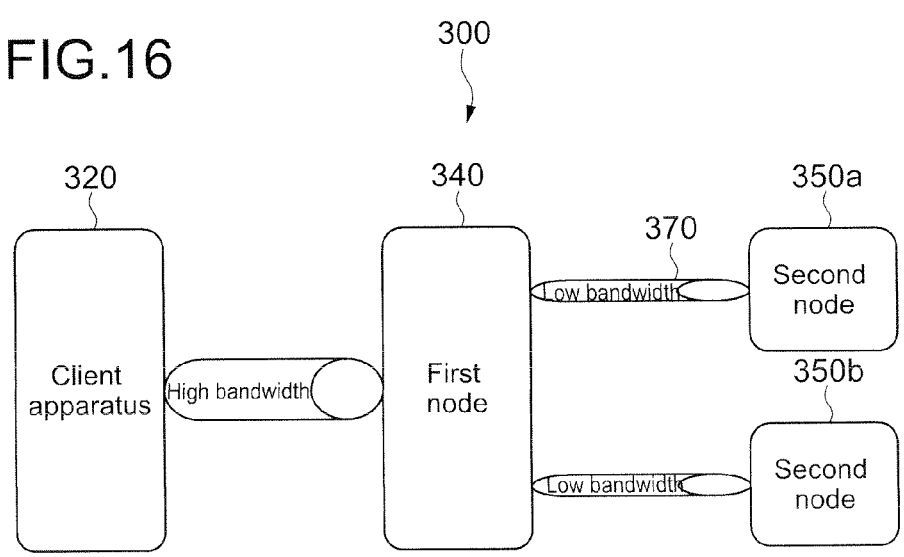
FIG. 16 is a schematic view showing a configuration example of an information processing system according to a third embodiment of the present disclosure.

FIG. 16 is a schematic view showing a configuration example of an information processing system according to a third embodiment of the present disclosure. An information processing system 300 includes a client apparatus 320, a first node 340, and two second nodes 350a and 350b.

Although FIG. 16 shows the single first node 340, a plurality of first nodes may be arranged, for example. Also in such a case, the technique according to this embodiment is applicable with the plurality of first nodes being considered as the single first node 340.

As shown in FIG. 16, the information processing system 300 is provided with the plurality of second nodes 350a and 350b and a plurality of low-bandwidth paths 370 are ensured. It is assumed that, in such a case, for example, data is read for each scene from the second nodes 350a and 350b to the first node 340 and cached.

In this case, a plurality of grouped scenes are alternately arranged in the second nodes 350a and 350b. With this, the plurality of scenes are alternately read from the two second nodes 350a and 350b, and hence it is possible to reduce a time to transfer data to the first node 340 that functions as a cache memory.

In this embodiment, each scene is further divided and the divided division scenes are alternately arranged in the second nodes 350a and 350b. With this, the efficient access becomes possible. Now, this will be described in detail.

FIG. 17 is a schematic view showing moving-image data 312 to be captured in the information processing system 300 according to this embodiment. FIG. 18 is a view for explaining how to arrange the moving-image data in the second nodes 350a and 350b.

Also in this embodiment, it is assumed that the moving-image data 312 grouped into seven scenes S1 to S7 is captured. As shown in FIG. 17, regarding the moving-image data 312, each of the scenes S1 to S7 is divided into three. Then, as shown in FIG. 18, pieces of odd-numbered division data S1a to S7c with the division scene S1a being a head are arranged in the second node 350b. Further, pieces of even-numbered division data S1b to S7b with the division scene S1b being a head are arranged in the second node 350a.

Figure 19A:
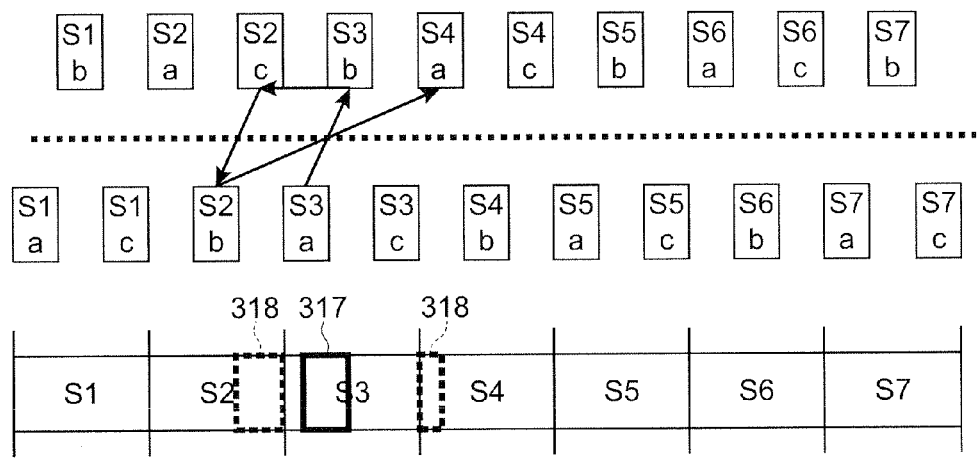
FIGS. 19A and 19B are schematic views each showing reading of divided scenes when read-ahead cache processing in an effect edit mode shown in FIGS. 13A and 13B is performed in this embodiment.
Figure 19B:
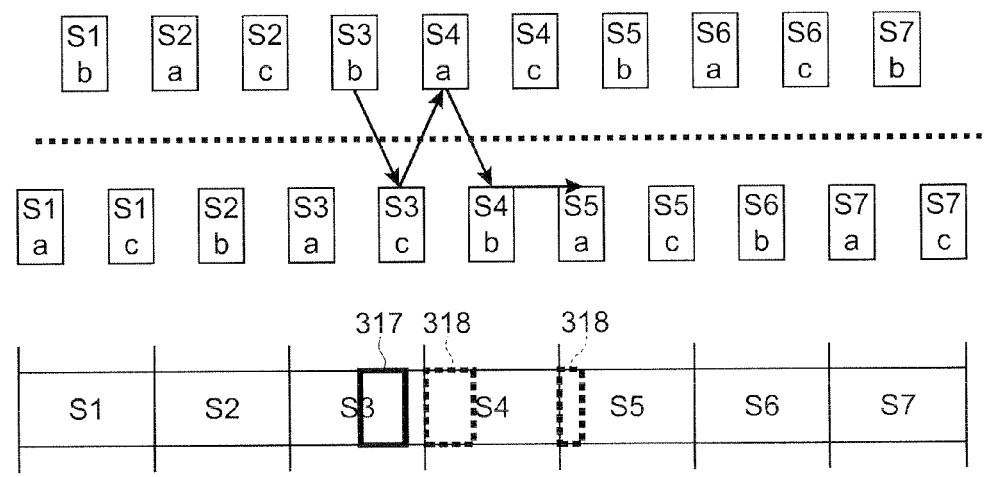

In this state, it is assumed that the read-ahead cache processing in each of the use modes shown in FIGS. 13A to 15B is performed. FIGS. 19A and 19B are schematic views each showing reading of the division scenes when the read-ahead cache processing in the effect edit mode shown in FIGS. 13A and 13B is performed.

As shown in FIG. 19A, first, linear block data 317 including a target frame image of the scene S3 is read. In order to do so, a division scene S3a is read from the second node 350b and then division scene S3b is read from the second node 350a.

Next, for reading of read-ahead block data 318 of the scene S2, a division scene S2c is read from the second node 350a and a division scene S2b is read from the second node 350b. Then, for reading of read-ahead block data 318 of the scene S4, a division scene S4a is read from the second node 350a.

In FIG. 19B, for reading of the linear block data 317, the division scene S3b is read from the second node 350a and a division scene S3c is read from the second node 350b. Next, for reading of the read-ahead block data 318 of the scene S4, the division scene S4a is read from the second node 350a and a division scene S4b is read from the second node 350b. Then, for reading of the read-ahead block data 318 of the scene S5, a division scene S5a is read from the second node 350b.

Figure 20A:
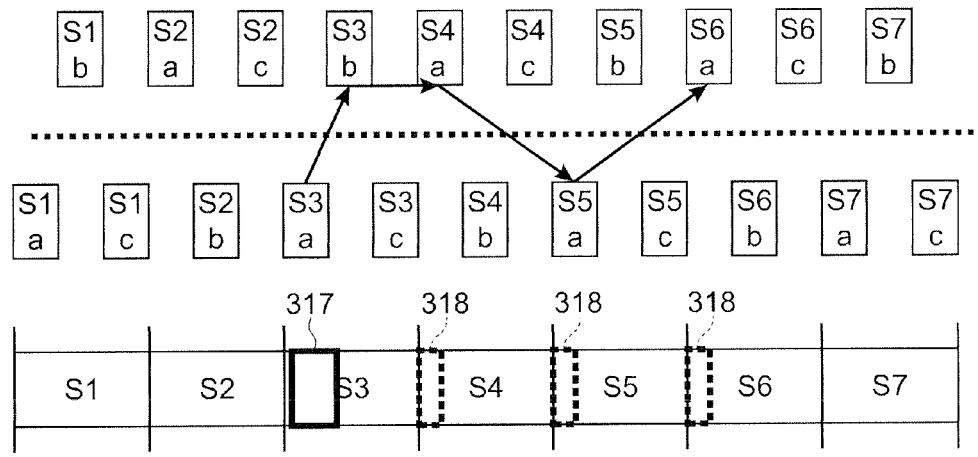
FIGS. 20A and 20B are schematic views each showing reading of the divided scenes when read-ahead cache processing in a preview reproduction mode (forward direction) shown in FIGS. 14A and 14B is performed in this embodiment.
Figure 20B:
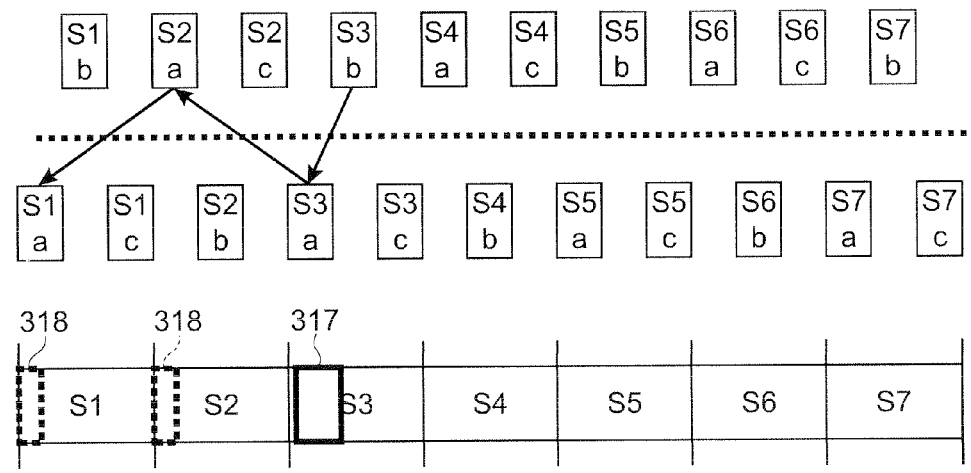

FIGS. 20A and 20B are schematic views each showing reading of the division scenes when the read-ahead cache processing in the preview reproduction mode (forward direction) shown in FIGS. 14A and 14B.

As shown in FIG. 20A, for reading of the linear block data 317, the division scene S3a is read from the second node 350b and the division scene S3b is read from the second node 350a. Next, for reading of the read-ahead block data 318 of the scenes S4 and S5, the division scene S4a is read from the second node 350a and the division scene S5a is read from the second node 350b. Then, for reading of the read-ahead block data 318 of the scene S6, a division scene S6a is read from the second node 350a.

In FIG. 20B, for reading of the linear block data 317, the division scene S3b is read from the second node 350a and the division scene S3a is read from the second node 350b. Next, for reading of the read-ahead block data 318 of the scenes S2 and S1, a division scene S2a is read from the second node 350a and the division scene S1a is read from the second node 350b.

Figure 21A:
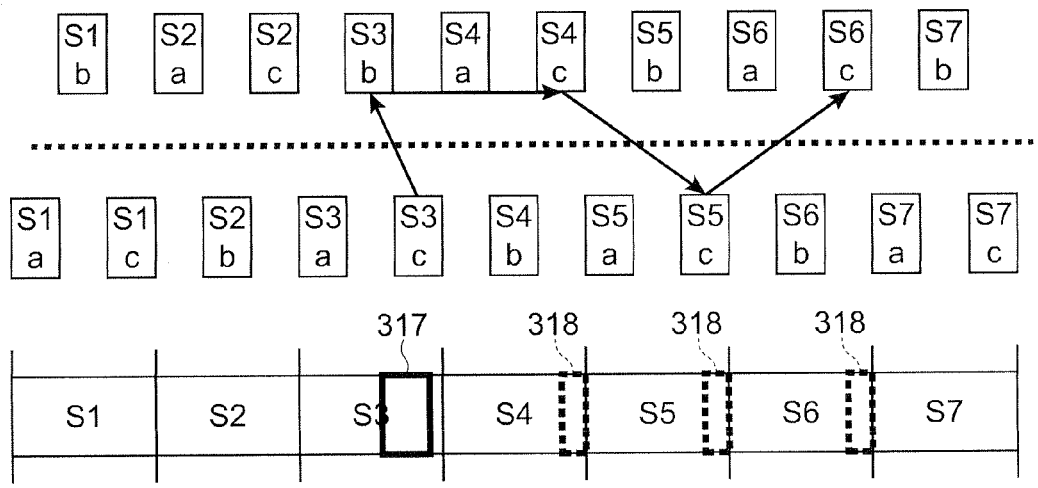
FIGS. 21A and 21B are schematic views each showing reading of the divided scenes when read-ahead cache processing in a preview reproduction mode (backward direction) shown in FIGS. 15A and 15B is performed in this embodiment.
Figure 21B:
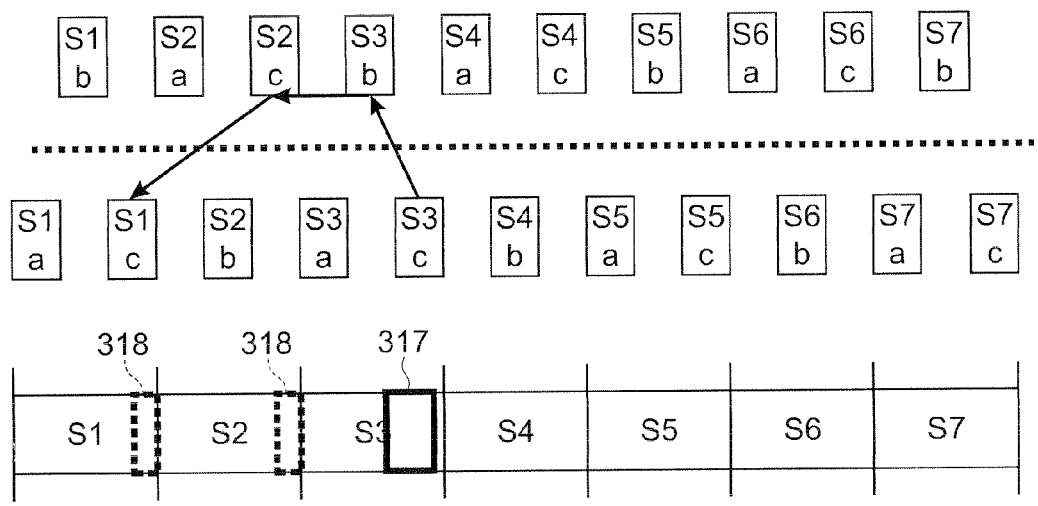

FIGS. 21A and 21B show schematic views each showing reading of the division scenes when the read-ahead cache processing in the preview reproduction mode (backward direction) shown in FIGS. 15A and 15B is performed.

As shown in FIG. 21A, for reading of the linear block data 317, a division scene S3c is read from the second node 350b and the division scene S3b is read from the second node 350a. Next, for reading of the read-ahead block data 318 of the scenes S4 and S5, a division scene S4c is read from the second node 350a and a division scene S5c is read from the second node 350b. Then, for reading of the read-ahead block data 318 of the scene S6, a division scene S6c is read from the second node 350a.

In FIG. 21B, for reading of the linear block data 317, the division scene S3c is read from the second node 350b and the division scene S3b is read from the second node 350a. Next, for reading of the read-ahead block data 318 of the scenes S2 and S1, the division scene S2c is read from the second node 350a and a division scene S1c is read from the second node 350b.

When the linear block data 317 and the read-ahead block data 318 are transferred to the first node 340, it is possible to reduce a data transfer time if data is alternately read from the second nodes 350a and 350b. Based on the data volume of each of the scenes S1 to S7, the volume of the respective block data, the number of scenes, the number of first and second nodes 340 and 350, and the like, each scene may be appropriately divided.

With this, as shown in FIGS. 19A to 20B, the number of times to alternately transfer the division scenes from the second nodes 350a and 350b to the first node 340 increases. As a result, it is possible to reduce a time for the read-ahead cache processing. In this embodiment, each of the scenes S1 to S7 is divided into three. However, off course, the present disclosure is not limited thereto.

Modified Example

Embodiments of the present disclosure are not limited to the above-mentioned embodiments and can be variously modified.

Figure 22A:
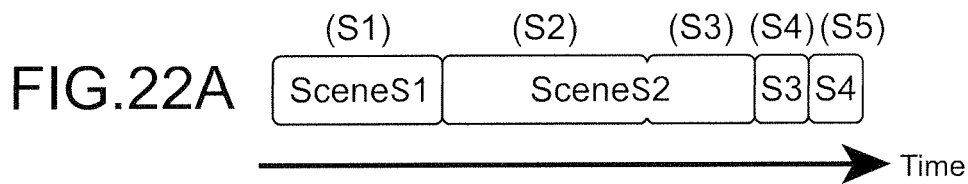
FIGS. 22A and 22B are schematic views for explaining a modified example relating to grouping of the moving-image data.
Figure 22B:
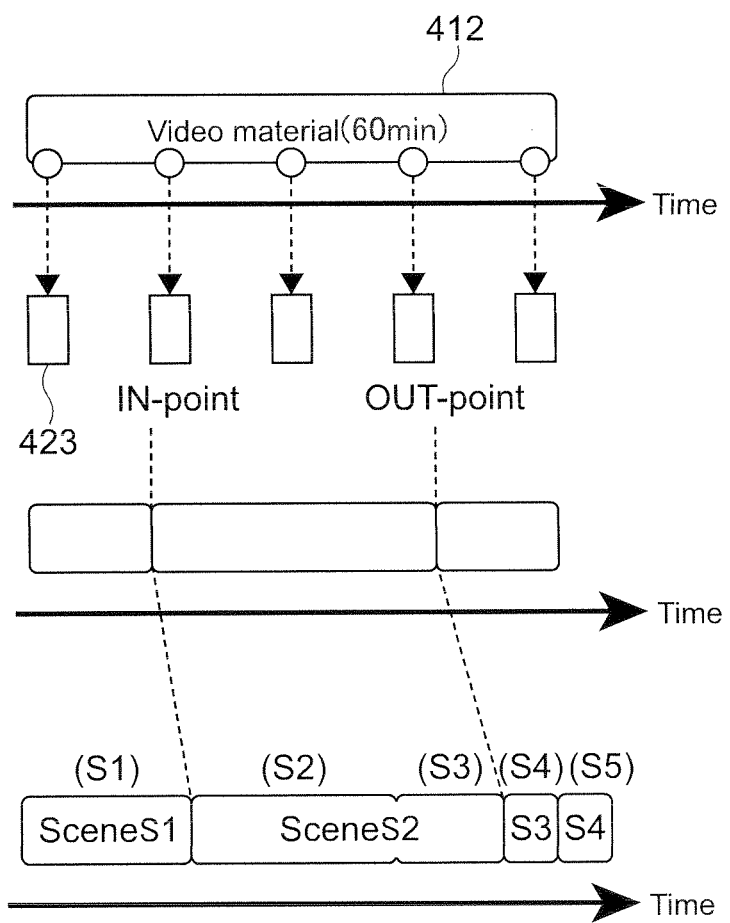

For example, FIGS. 22A and 22B are schematic views for explaining a modified example relating to the grouping of the moving-image data. In this modified example, according to an instruction by the user, which is transmitted to the storage manager through the client apparatus, the plurality of scenes can be changed. With this, the efficient access becomes possible.

As shown in FIGS. 22A and 22B, out of the plurality of scenes that have been subjected to the grouping processing, the plurality of scenes different from each other may be changed as a single scene. In FIGS. 22A and 22B, out of the scenes S1 to S5, the scenes S2 and S3 are changed as the single scene S2. That is effective, for example, when it is desirable to handle two scenes associated with each other as a single scene.

By the user using, for example, the UI 21 shown in FIG. 11 to appropriately select the head thumbnail images 23 of the respective scenes S1 to S5, a group change operation is performed. However, the operation method by the user and the like for performing the group change operation processing are not limited.

Alternatively, as shown in FIG. 22B, thumbnail images 423 are generated at fixed intervals in moving-image data 412. With the thumbnail images 423 being references, the user sets an IN-point and an OUT-point. Based on the IN-point and the OUT-point, group change processing may be performed.

In the example shown in FIG. 22B, the second half of the scene S1 is specified as the IN-point and the first half of the scene S3 (before change) is specified as the OUT-point. Based on this specification, the scene S2 and the scene S3 are changed as a single scene S2. Matching between the specification of the IN-point and the OUT-point and the group change can be appropriately set.

With respect to the moving-image data 12 grouped into the plurality of scenes S1 to S5 shown in FIG. 3 and the like, the respective scenes S1 to S5 may be analyzed. Then, based on the analysis result, the read-ahead target frame image may be read.

For example, it is assumed that the moving-image data is news video data. In this moving-image data, each scene is analyzed. As a result, out of the plurality of scenes, studio scenes, landscape scenes, news reporter scenes are determined.

For example, the user may desire to perform predetermined editing processing only on the studio scenes. In such a case, for example, according to an instruction from the user, only the studio scenes are selected out of the plurality of scenes. Then, the technique described above in each of the embodiments may be applied to the plurality of selected studio scenes and the read-ahead target frame image may be appropriately read. With this, for example, the read-ahead processing and the like on the plurality of scenes having a high correlation with each other become possible. Thus, the efficient access is realized.

In the case where metadata is added to each of the plurality of frame images to be captured, based on the metadata, scene analysis processing may be performed. When the grouping processing is performed, the scene analysis processing result, the metadata, and the like may be used.

Further, the plurality of scenes may be appropriately reduced and used. For example, in a quad-speed reproduction mode or an octuple-speed reproduction mode, using only the odd-numbered or even-numbered scenes, the data output processing and the read-ahead cache processing that are described above may be performed.

In the above description, when the file output apparatus captures the material data, the grouping processing is performed on the material data. Alternatively, this grouping processing may be performed at another timing.

That is, upon capture of the material data, the consecutive data before grouping into the plurality of groups is stored as it is. The material data may be stored on the single second node and may be divided for each predetermined volume. This division is processing to be performed for storing the whole of the material data. Then, at a predetermined timing before the access request from the client apparatus is received, the consecutive data is grouped into the plurality of groups and stored.

The predetermined timing is limited. For example, a timing at which the access request from the external apparatus can be appropriately coped with is adopted. Alternatively, after the access request is received, the grouping processing may be performed.

For example, in some cases, the material data is captured when a plurality of client apparatuses concurrently access. In such cases, if the grouping processing on the material data are sequentially performed, processing loads of the first node, the control apparatus, and the like adversely increases. In addition, a time for data output to a plurality of client apparatuses also increases. Therefore, the material data is stored as it is, that is, as a large file and the grouping processing is performed at a timing at which the processing loads of the first node, the control apparatus, and the like are lower. With this, it is possible to prevent the data output to the client apparatus from being delayed.

It should be noted that, in the above description, the grouping processing is performed by the first node. However, a PC or the like for executing the grouping processing may be separately provided. Further, the first node may function also as the control apparatus. In this case, the first node includes the storage manager.

In the above description, the output capability of the nodes is classified into two phases. However, it may be classified into more phases. For example, the output capability may be classified into three phases and a high-bandwidth node, a medium-bandwidth node, and the low-bandwidth node may be set. Appropriately using those nodes, the information processing system may be realized as an embodiment of the present disclosure.

In the above description, the moving-image data is used as the consecutive data. However, music data and the like may be used. For example, in the music data, the introduction, refrain, and interlude parts are detected. Then, the music data is grouped into the parts and stored. The technique described above in each of the embodiments may be applied to the thus stored music data.

In the above description, the control apparatus, the first node, and the second node are separately provided. However, for example, a single computer such as a PC may execute the above-mentioned information processing method. That is, the computer includes a grouping unit, an output unit, and a reading unit that are realized by a CPU that operates according to a program. Further, the computer includes a first storage unit having a high bandwidth and a second storage unit having a low bandwidth.

The grouping unit groups temporally consecutive data into a plurality of groups based on a reference defined in advance. The output unit reads, in response to an access request from an external apparatus, target data to be a target of the request from a first group including the target data and outputs the read target data to the external apparatus through the first storage unit. The reading unit reads, in response to the reading of the target data by the output unit, at least part of data included in a second group different from the first group from the second storage unit as read-ahead data and stores the read data on the first storage unit.

By the single computer having such a configuration, the information processing method according to the present disclosure may be executed. With this, the information processing apparatus and the program according to the embodiments of the present disclosure are realized.

Appropriate combinations of the above-mentioned embodiments and modified example may be adopted as embodiments according to the present disclosure.

It should be noted that the present disclosure may also take the following configurations.

(1) An information processing method, including:

grouping temporally consecutive data into a plurality of groups based on a reference defined in advance and storing the grouped data;

reading, in response to an access request from an external apparatus, target data to be a target of the request from a first group including the target data and outputting the read target data to the external apparatus; and reading, in response to the reading of the target data, at least part of data from a second group different from the first group as read-ahead target data.

(2) The information processing method according to Item (1), in which the temporally consecutive data is a plurality of temporally consecutive frame images, the plurality of groups each include at least one or more of the frame images, the target data is a target frame image to be the target of the request, and the read-ahead target data is at least one or more of the frame images included in the second group.

(3) The information processing method according to Item (2), in which
the grouping temporally consecutive data includes storing the plurality of frame images by a first storage unit configured to store the frame images and to have a first output capability for outputting the stored frame images and by a second storage unit configured to have a second output capability lower than the first output capability,
the reading target data includes outputting the target frame image stored on the first storage unit to the external apparatus, and
the reading at least part of data includes reading the read-ahead target frame image as the read-ahead target data from the second storage unit and causing the first storage unit to store the read-ahead target frame image.
(4) The information processing method according to Item (2) or (3), in which
the reference defined in advance is grouping for each scene, and
the grouping temporally consecutive data includes grouping the plurality of frame images into a plurality of scenes as the plurality of groups and storing the grouped frame images.
(5) The information processing method according to item (4), further including:
analyzing each of the plurality of scenes, in which
the reading at least part of data includes reading the read-ahead target frame image based on the analysis result.
(6) The information processing method according to any one of Items (2) to (5), in which
the grouping temporally consecutive data includes storing the plurality of frame images by a plurality of first storage units and a plurality of second storage units.
(7) The information processing method according to any one of Items (2) to (6), further including:
receiving, from the external apparatus, use mode information of the target frame image, in which
the reading at least part of data includes the read-ahead target frame image based on the received use mode information.
(8) The information processing method according to any one of Items (1) to (7), further including:
changing the plurality of groups according to an instruction from a user, the instruction being transmitted through the external apparatus.
(9) The information processing method according to any one of Items (1) to (8), in which
the grouping temporally consecutive data includes storing the consecutive data before grouping into the plurality of groups and grouping, at a predetermined timing before the access request from the external apparatus is received, the stored consecutive data into the plurality of groups and storing the grouped data.

The present disclosure contains subject matter related to that disclosed in Japanese Priority Patent Application JP 2011-200442 filed in the Japan Patent Office on Sep. 14, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing method, comprising:
grouping temporally consecutive data, which is a plurality of consecutive frame images, into a plurality of groups based on a reference defined in advance and storing the grouped data, wherein the plurality of groups each include at least one or more of the frame images, and wherein the grouping temporally consecutive data includes storing the plurality of frame images by a first storage unit configured to store the frame images and to have a first output capability for outputting the stored frame images and by a second storage unit configured to have a second output capability lower than the first output capability;
reading, in response to an access request from an external apparatus, target data to be a target of the request from a first group including the target data, wherein the target data is a target frame image to be the target of the request, and outputting the read target data, including the target frame image stored on the first storage unit, to the external apparatus; and
reading, in response to the reading of the target data, at least part of data from a second group different from the first group as read-ahead target data, which is at least one or more of the frame images included in the second group, wherein the reading at least part of data includes reading the read-ahead target frame image as the read-ahead target data from the second storage unit and causing the first storage unit to store the read-ahead target frame image.

2. The information processing method according to claim 1, wherein
the reference defined in advance is grouping for each scene, and
the grouping temporally consecutive data includes grouping the plurality of frame images into a plurality of scenes as the plurality of groups and storing the grouped frame images.

3. The information processing method according to claim 2, further comprising:
analyzing each of the plurality of scenes,
wherein the reading at least part of data includes reading the read-ahead target frame image based on the analysis result.

4. The information processing method according to claim 1, wherein the grouping temporally consecutive data includes storing the plurality of frame images by a plurality of first storage units and a plurality of second storage units.

5. The information processing method according to claim 1, further comprising:
receiving, from the external apparatus, use mode information of the target frame image,
wherein the reading at least part of data includes the read-ahead target frame image based on the received use mode information.

6. The information processing method according to claim 1, further comprising:
changing the plurality of groups according to an instruction from a user, the instruction being transmitted through the external apparatus.

7. The information processing method according to claim 1, wherein the grouping temporally consecutive data includes storing the temporally consecutive data before grouping into the plurality of groups and grouping, at a predetermined timing before the access request from the external apparatus is received, the stored temporally consecutive data into the plurality of groups and storing the grouped data.

8. An information processing system, comprising:
a first storage apparatus configured to group temporally consecutive data, which is a plurality of consecutive frame images, into a plurality of groups based on a reference defined in advance and store at least part of the temporally consecutive data and to have a first output capability for outputting the stored data, wherein the plurality of groups each include at least one or more of the frame images;

a second storage apparatus configured to store at least part of the data grouped into the plurality of groups and to have a second output capability for outputting the stored data, the second output capability being lower than the first output capability; and a control apparatus configured to read, in response to an access request from an external apparatus, target data to be a target of the request from a first group including the target data, wherein the target data is a target frame image to be the target of the request, and cause the first storage apparatus to output the read target data to the external apparatus, including the target frame image stored on the first storage unit, and to cause, in response to the reading of the target data, the second storage apparatus to output at least part of data included in a second group different from the first group to the first storage apparatus as read-ahead target data, which is at least one or more of the frame images included in the second group, wherein the output of at least part of data includes outputting the read-ahead target frame image as the read-ahead target data from the second storage unit and causing the first storage unit to store the read-ahead target frame image.

9. An information processing apparatus, comprising:

a grouping unit configured to group temporally consecutive data, which is a plurality of consecutive frame images, into a plurality of groups based on a reference defined in advance, wherein the plurality of groups each include at least one or more of the frame images;

a first storage unit configured to store at least part of the data grouped into the plurality of groups and to have a first output capability for outputting the stored data;

a second storage unit configured to store at least part of the data grouped into the plurality of groups and to have a second output capability for outputting the stored data, the second output capability being lower than the first output capability;

an output unit configured to read, in response to an access request from an external apparatus, target data to be a target of the request from a first group including the target data, wherein the target data is a target frame image to be the target of the request, and to output the read target data, including the target frame image stored on the first storage unit, to the external apparatus through the first storage unit; and a reading unit configured to read, in response to the reading of the target data by the output unit, at least part of data included in a second group different from the first group from the second storage unit as read-ahead data and to cause the first storage unit to store the read data.

10. A non-tangible computer-readable medium having a set of computer-executable instructions embodied thereon that causes a computer to function as:

a grouping unit configured to group temporally consecutive data, which is a plurality of consecutive frame images, into a plurality of groups based on a reference defined in advance, wherein the plurality of groups each include at least one or more of the frame images;

a first storage unit configured to store at least part of the data grouped into the plurality of groups and to have a first output capability for outputting the stored data;

a second storage unit configured to store at least part of the data grouped into the plurality of groups and to have a second output capability for outputting the stored data, the second output capability being lower than the first output capability;

an output unit configured to read, in response to an access request from an external apparatus, target data to be a target of the request from a first group including the target data, wherein the target data is a target frame image to be the target of the request, and to output the read target data, including the target frame image stored on the first storage unit, to the external apparatus through the first storage unit; and a reading unit configured to read, in response to the reading of the target data by the output unit, at least part of data included in a second group different from the first group from the second storage unit as read-ahead data and to cause the first storage unit to store the read data.

11. The information processing system according to claim 8, further comprising:

a storage manager configured to receive, from the external apparatus, use mode information of the target data, wherein the received use mode information of the target data determines a part of the second group which is to be output as the read-ahead target data.

12. The information processing system according to claim 11, wherein the received use mode information of the target data determines whether an initial part, a terminal part, or a middle part of the second group is to be output as the read-ahead target data.

* * * * *